US006647381B1

(12) United States Patent
Li et al.

(10) Patent No.: US 6,647,381 B1
(45) Date of Patent: Nov. 11, 2003

(54) METHOD OF DEFINING AND UTILIZING LOGICAL DOMAINS TO PARTITION AND TO REORGANIZE PHYSICAL DOMAINS

(75) Inventors: Wen-Syan Li, Fremont, CA (US); Okan Kolak, College Park, MD (US); Quoc Vu, San Jose, CA (US)

(73) Assignee: NEC USA, Inc., Princeton, NJ (US)

( * ) Notice: Subject to any disclaimer, the term of this patent is extended or adjusted under 35 U.S.C. 154(b) by 0 days.

(21) Appl. No.: 09/491,525

(22) Filed: Jan. 26, 2000

Related U.S. Application Data

(60) Provisional application No. 60/161,726, filed on Oct. 27, 1999, and provisional application No. 60/169,114, filed on Dec. 6, 1999.

(51) Int. Cl.[7] .............................................. G06F 17/30
(52) U.S. Cl. ................................ 707/3; 707/5; 707/10; 707/4
(58) Field of Search ............................. 707/5, 10, 501, 707/3, 4

(56) References Cited

U.S. PATENT DOCUMENTS

| 6,356,899 B1 | * | 3/2002 | Chakrabarti et al. | ............ 707/5 |
| 6,366,899 B1 | * | 4/2002 | Kernz | ............................ 707/1 |
| 6,457,002 B1 | * | 9/2002 | Beattie et al. | .................. 707/3 |

OTHER PUBLICATIONS

Bharat, Krishna, et al., "The Connectivity Server: Fast Access to Linkage Information on the Web," *Computer Networks and ISDN Systems*, (30) 1998, pp. 469–477.

Kumar, Ravi, et al., "Trawling the Web for Emerging Cyber–Communities," In *Proceedings of the 8th WorldWide Web Conference*, Toronto, Canada, May 1999.

Bharat, Krishna, et al., "Mirror, Mirror, on the Web: A Study of Host Pairs with Replicated Content," In *Proceedings of the 8th World–Wide Web Conference*, Toronto, Canada, May 1999.

Chakrabarti, Soumen, et al., "Automatic Resource Compilation by Analyzing Hyperlink Structure and Associated Text," In *Proceedings of the 7th World–Wide Web Conference*, pp. 65–74, Brisbane, Queensland, Australia, Apr. 1998.

Bharat, Krishna, et al., "Improved Algorithms for Topic Distillation in a Hyperlinked Environment," In *Proceedings of the 21th Annual International ACM SIGIR Conference*, pp. 104–111, Melbourne, Australia, Aug. 1998.

Mukherjea, Sougata, et al., "Focus+Context Views of Worle–Wide Web Nodes," In *Proceedings of the Eight ACM Conference on Hypertext*, pp. 187–196, Southampton, England, Apr. 1997.

(List continued on next page.)

*Primary Examiner*—Kim Vu
*Assistant Examiner*—Baoquoc N To
(74) *Attorney, Agent, or Firm*—Sughrue Mion, PLLC

(57) ABSTRACT

One or more logical domains may be utilized for partitioning and reorganizing a single physical domain or a search space constituted by a plurality of physical domains. Logical domains include at least one page selected from the plurality of pages in the physical domain. Responsive to a request for information, each logical domain may be ranked according to subject matter relevance to the information requested. Definition and relevance ranking of logical domains enables Web site mapping which supports multi-granularity and content-sensitivity in response to a request for information. A multi-granular site map presents users with differing levels of detail, from a general overview of site topology to detailed views of specific areas of the map. A topic-focused site map presents users with a general view of site topology with a detailed view of an area of the site which contains information of interest.

78 Claims, 9 Drawing Sheets

OTHER PUBLICATIONS

Chen, Chaomei, "Structuring and Visualizing the WWW by Generalized Similarity Analysis," In *Proceedings of the Eight ACM Conference on Hypertext*, pp. 177–186. Southampton, England, Apr. 1997.

Kleinberg, Jon M., "Authoritative Sources in a Hyperlinked Environment," In *Proceedings of the ACM–SIAM Symposium on Discrete Algorithms*, pp. 668–677, Jan. 1998.

Li, Wen–Syan, et al., "Query Relaxation By Structure for Document Retrieval on the Web," In *Proceedings of 1998 Advanced Database Symposium*, Shinjuku, Japan, Dec. 1999.

Tajima, Keishi, et al., "Cut as a Querying Unit for WWW, Netnews, e–mail," In *Proceedings of the 1998 ACM Hypertext Conference*, pp. 235–244, Pittsburgh, PA, USA, Jun. 1998.

Takano, Hajime, et al., "Dynamic Bookmarks for the WWW," In *Proceedings of the 1998 ACM Hypertext Conference*, pp. 297–298, Pittsburgh, PA, USA, Jun. 1998.

AltaVista Technology, Inc. of California. *Information available at* http://www.altavista.com/.

NEC Corporation, *Information available at* http://www.biglobe.ne.jp/.

Yahoo Inc. *Information available at* http://geocities.yahoo.com/home/.

America Online, Inc. *Information available at* http://wwwaol.com/.

George Furnas, "Generalized Fisheye Views", In proceedings of the ACM SIGCHI '86 Conference on Human Factors in Computing Systems, pp. 16–23, Boston, MA, Apr. 1986.

Sougata Mukherjea et al., "Visualizing the World–Wide Web with the Navigational View Builder", Computer Networks and ISDN Systems. Special Issue on the Third International World–Wide Web Conference, Darmstadt, Germany, 27(6):1075–1087, Apr. 1995.

Yoelle S. Maarek et al., "WebCutter: A System for Dynamic and Tailorable Site Mapping", In proceedings of the Sixth International World–Wide Web Conference, pp. 713–722, Santa Clara, CA, Apr. 1997.

Sougata Mukherjea et al., "Visualizing Complex Hypermedia Networks Through Multiple Hierarchical Views", In proceedings of the ACM SIGCHI '95 Conference on Human Factors in Computing Systems, pp. 331–337, Denver, CO, May 1995.

David Durand et al., "MAPA: A System for Inducing and Visualizing Hierarchy in Websites", In proceedings of the Ninth ACM Conference on Hypertext, pp. 66–76, Pittsburgh, PA, Jun. 1998.

Stuart K. Card et al., "The WebBook and the Web Forager: An Information Workspace for the World–Wide Web", In proceedings of the 1996 ACM CHI Conference, pp. 111–117, Vancouver, BC, Canada, Apr. 1996.

Chaomei Chen et al., "From Latent Semantics to Spatial Hypertext—An Integrated Approach", In proceedings of the Ninth ACM Conference on Hypertext, pp. 77–86, Pittsburgh, PA, Jun. 1998.

Loren Terveen et al., "Finding and Visualizing Inter–Site Clan Graphs", In proceedings of the ACM SIGCHI '98 Conference on Human Factors in Computing Systems, pp. 448–455, Los Angeles, CA, Apr. 1998.

Keishi Tajima et al., "Discovery and Retrieval of Logical Information Units in Web", In proceedings of the 1999 ACM Digital Libraries Workshop on Organizing Web Space, Berkeley, CA, Aug. 1999.

Yoshiaki Mizuuchi et al., "Finding Context Paths for Web Pages", In proceedings of the 1999 ACM Hypertext Conference, Dannstadt, Germany, Feb. 1999.

J.E. Pitkow et al., "Emerging Trends in the WWW User Population", *Communications of the ACM*, 39(6):106–108, Jun. 1996.

K. Andrews, "Visualizing Cyberspace: Information Visualization in the Harmony Internet Browser", In *Proceedings of the 1995 Information Visualization Symposium*, pp. 97–104, Atlanta, GA, 1995.

R.J. Hendley, et al., "Narcissus: Visualizing Information", In *Proceedings of the 1995 Information Visualization Symposium*, pp. 90–96, Atlanta, GA, 1995.

R.A. Botafogo, et al., Structural Analysis of Hypertexts: Identifying Hierarchies and Useful Metrics. *ACM Transactions on Office Information Systems*, 10(2):142–180, 1992.

Kenji Hatano et al., "An Interactive Classification of Web Documents by Self–Organizing Maps and Search Engines", In *Proceedings of the Sixth International Conference on Database Systems for Advanced Applications (DASFAA)*,, pp. 35–42, Hsinchu, Taiwan, Apr. 1999.

\* cited by examiner

```
Rule#1  url                         : "/~[^/]*/?$"                          : +60
Rule#2  url   : "^[^~]*/(people|users?|class(es)?|projects?|seminars?)/$" : +30
Rule#3  url                         : "^[^~]*/$"                            : +20
Rule#4  url                         : "/cgi\-bin/"                          : -100
Rule#5  title                       : "\bhome\b"                            : +10
        title                       : "\bweb\b.*\bpage\b"                   : +10
        title                       : "\bwelcome\b"                         : +5
Rule#6  incoming link anchor text   : "^home$"                              : +5
        incoming link anchor text   : "\bgo\b.*\bhome\b"                    : +5
        incoming link anchor text   : "\breturn\b.*\bhome\b"                : +5
Rule#7  outgoing link anchor text   : "^home$"                              : -10
        outgoing link anchor text   : "\bgo\b.*\bhome\b"                    : -10
        outgoing link anchor text   : "\breturn\b.*\bhome\b"                : -10
Rule#8  title of the linked page    : "\bhome\b"                            : -10
        title of the linked page    : "\bweb\b.*\bpage\b"                   : -10
        title of the linked page    : "\bwelcome\b"                         : -5
Rule#9  external incoming link count : >0                                   : +20
        external incoming link count :                                      : +20%
Rule#10 outgoing link count         : >20                                   : +5
Rule#11 internal incoming link count : == 0                                 : +20
```

FIG. 2

METHOD OF DEFINING AND UTILIZING LOGICAL DOMAINS TO PARTITION AND TO REORGANIZE PHYSICAL DOMAINS

This application claims the benefit of U.S. Provisional Application No. 60/161,726, filed Oct. 27, 1999, entitled "Defining Logical Domains in a Web Site."

This application also claims the benefit of U.S. Provisional Application No. 60/169,114, filed Dec. 6, 1999, entitled "Constructing Multi-Granular and Topic-Focused Web Site Maps."

This application is also related to a copending application, Ser. No. 09/461,561, filed Dec. 14, 1999, entitled "Document Retrieval By Information Unit."

The disclosures of all of these applications are hereby incorporated by reference.

BACKGROUND OF THE INVENTION

1. Field of the Invention

This invention relates generally to a method of partitioning and reorganizing physical domains into logical domains, and more particularly to a method of utilizing logical domains for the construction of multi-granular and topic-focused site maps of part of a physical domain or a search space.

2. Description of the Related Art

Use of the internet, and in particular the World Wide Web (WWW or Web), has recently been increasing at a rapid rate. The explosive popularity of the WWW has been accompanied by a tremendous growth in the size of the Web and the scope of its content. Due to the ever-increasing size and complexity of the search space, many queries of the vast WWW, for example, yield such a large number of matched Web pages that the results returned by the search engine are not useful. Even when specific information related to a definite topic is sought, Web users often encounter difficulties in foraging for relevant pages. Many of these difficulties are rooted in the structure of the search space and can be attributed to the deficiencies inherent in the way conventional search techniques and result organization schemes operate.

Generally, the Web includes many Hyper-Text Markup Language (or HTML) documents, or pages, and each page is assigned a unique Universal Resource Locator (URL) for identification and location purposes. The URLs are organized into physical domains; each physical domain is defined as a set of pages associated with a single host, and each page located within a particular physical domain contains the host name in its URL. For example, the URLs www.ccrl.com and www.ccrl.com/dl99ws/ identify individual pages which are both hosted by a Web server (or series of Web servers) having a unique host name (i.e.: www.ccrl.com). The pages identified by these two URLs are, therefore, each in the same physical domain. Since a particular URL represents a unique identifier for every HTML page, the URL is the preferred means utilized by conventional search engines and query processing methods for organizing Web query results in a physical domain.

With many conventional Web search engines, for example, query results or information reported in response to a request are grouped exclusively by physical domain and are presented in the form of a set of clusters of URLs within a particular physical domain. This organizational strategy is advantageous to the extent that the clusters can potentially provide a user with a visualization of the topology of the search space, i.e., how the pages are linked together. A user may thus first locate the most relevant site and browse through matched pages within that site. Organizing query results exclusively by physical domain has two significant limitations, however, especially when a physical domain contains large Web sites.

First, large Web sites tend to contain many matching pages arranged in only a few large, flat-structured, and unorganized clusters. This phenomenon is attributable to the fact that many pages, by virtue of their presence in the same physical domain, have related or similar URLs. For example, many large Web sites, such as Geocities, AOL, and NEC BIGLOBE, are either Internet Service Provider (ISP) sites or Web site hosting providers; consequently, these sites represent enormous physical domains. Typically, if one page contains pertinent information, many pages with similar URLs will also be returned as a match in response to a request for information. Many of the matching pages are only relevant to the extent that their URLs contain a given string of characters, namely, the DNS name; the actual contents of the pages may be totally irrelevant. The inclusion of irrelevant material in the search results shifts the burden of distinguishing between relevant pages and irrelevant pages from the search engine to the user.

Second, even assuming that all of the information returned by the search engine were relevant, grouping results by physical domain does not provide a well organized and convenient way for users to locate the most relevant pages in Web sites. For example, given a query containing the keyword "XML," many portal sites specializing in XML material, such as www.xml.org and www.w3c.org, tend to offer a large number of matches which, when displayed in the form of a query result, are not categorized or otherwise summarized by a typical search engine. A method of presenting a user with an hierarchical display representing how the hundreds of pages are related in addition to their URL similarities will usually be of greater utility to a user than merely displaying, in list form, hundreds of pages within a given physical domain without any indication as to the way the pages are related.

In addition, while Web site maps can play an essential role in assisting users in navigating a Web site, many site maps can also prove to be inefficient or wholly ineffective with respect to the goal of assisting navigation. Ideally, such maps should provide users with a view of both the contents (i.e.: pages) as well as the link structure (i.e.: topology) of the Web sites they represent. Since, as noted above, the state of the art involves organizing query results and requests for information mainly according to physical domain, the typical site map necessarily reflects only the content and structure of a physical domain. To the extent that the organization of a physical domain is deficient or renders navigation tedious, the site map representing that physical domain can offer little or no assistance to a user interested in finding information regarding a particular topic of interest. A method of organizing results responsive to keyword queries or other requests for information into convenient and usable form should be, therefore, adapted for the construction of site maps having greater utility to users.

Many Web-masters presume that users of their sites have different hardware capabilities, network bandwidths, and preferences for interacting with the site. To support a more user-friendly and pleasant Web surfing experience, many Web sites support several variations with respect to the way information is presented to a user, such as, for example, text modes, graphics modes which may or may not support frames, Java™ scripts, and so forth. Although users with different hardware or bandwidth capabilities are supported, the fact that different users may be browsing for different topics of interest is usually overlooked. For instance, most of the site maps are static, i.e.: predetermined and unalterable. The static nature of the typical site map is most evident at big portal sites that present vast amounts of information covering many diverse subjects. Such a static approach to site mapping is deficient to the extent that it assumes that a single map is suitable for all users who may visit the site.

For example, different users generally have different preferences with respect to visiting a Web site, and different users may visit the same site for different purposes. On any given Web site, for instance, one user may be hunting for particular information, while another user may simply be surfing the Web for enjoyment without any well-defined target in mind. Obviously, the relative expectations of these two users with respect to site map complexity are necessarily different. The former may want to see a detailed map which aids in speedy navigation to a specific directory containing the specific information sought, while the latter may prefer a more abstract map which merely offers a general overview of the contents of the Web site. It is desirable, therefore, to construct site maps which support multiple levels of granularity. A multi-granular site map enables a user selectively to examine different portions of the site in varying degrees of detail, from the very general to the very specific.

As another example, different users generally have different topics of interests in mind when conducting a search. In the case of an on-line "super-store" having many different types of items for sale, one user searching for "hardware tools" and another user interested in "beauty products," for example, may issue keyword queries related to their respective topics on the same site. Each respective user would prefer to be presented with a site map which is focused primarily on his or her respective topic of interest, with little emphasis on the rest of the site. The site map, therefore, should be flexible so as to adjust for various users desiring information on different topics of interest. For each user, the area of the site map related to preferred interests should be emphasized in detail, while the rest of the map may display only cursory or general information; that is, just enough information to illustrate the Web site's topology.

Based upon the foregoing observations, some requirements for a convenient and user-friendly site map can be summarized as follows. A site map should be: capable of summarizing, in general form, the contents of the site searched; capable of preserving and displaying the topology of the site, thereby supporting navigation from page to page throughout the site; flexible and adjustable, or multi-granular, such that both the overview of the contents as well as the detailed particulars of sections of the total contents may be selectively presented; and content-sensitive (or "topic-focused") so as to support multiple users having different interests.

There has been a continuing and growing need for a method of partitioning and reorganizing search spaces, such as large XML databases or physical domains on the Web, according to a system of logical domains, wherein a logical domain is defined as a group of related pages which collectively represent a particular theme, function, concept, or topic of interest. Such a method preferably enables content-sensitive site mapping of the search space wherein multiple levels of granularity are supported.

SUMMARY OF THE INVENTION

Directed to partitioning and reorganizing physical domains, the method of the present invention addresses the above-mentioned considerations and overcomes these and other shortcomings of conventional searching and reporting techniques through the identification of logical domains responsive to a request for information. Additionally, the method of the present invention satisfies the requirements for a convenient reporting and displaying technique by implementing logical domains in the construction of multi-granular and topic-focused site maps representing certain areas of a search space or a physical domain. In particular, the site maps enabled by the method of the present invention are dynamically related to any or all of the following: the focus of a keyword query; the key topic of interest in another form of request for information; or organization specification.

The operative environment for the method of the present invention is a search space comprising a set of documents (hypertext or hypermedia documents, for example, such as HTML or XML documents), or pages. Each page in the search space is located in a particular physical domain as a means of organization. The present invention introduces the concept of a logical domain into this environment. Whereas physical domains on the Web, for instance, are defined based upon DNS names as represented by character strings in URLs, logical domains are defined based upon the whole spectrum of Web page metadata (including URLs, titles, and anchors) as well as actual page contents, link structure, and citation relationships. A logical domain is a set of pages which are related by semantic and syntactic structure, and which, collectively, represent a logical unit of information which pertains to a particular theme, function, concept, or topic of interest. For example, such Web sites as an individual user's "home page," a research group's "project" page, and "a tutorial on XML" can all be viewed as logical domains, since each represents a group of pages which collectively relate to a particular theme or function.

Responsive to a request for information, such as an issued query, for example, the preferred embodiments of the present invention begin with identification of logical domain entry page candidates, which are scored according to various attributes such as page metadata, subject matter relevance of page content, and citation information associated with each of the candidates. An entry page, which defines the top of a directory tree for a logical domain, is selected from the highest scoring candidates. Thereafter, the pages within the boundaries of the logical domain are determined by assigning pages according to page metadata, accessibility from the entry page as measured by path information and link structure, or some combination of these factors. This procedure is repeated until a desired number of logical domains are defined. Preferably, a recursive procedure assures appropriately sized and sufficiently relevant logical domains.

According to one preferred embodiment of the present invention described herein, for instance, the size of the logical domains may be selectively adjustable so as to provide adequate information without providing an overwhelming number of pages. The entry pages and boundaries of logical domains are dynamically adjusted in a recursive procedure, beginning with the pages located at the bottom of the physical domain and working up to the top. Each successive iteration is designed to eliminate logical domains which are so small as to be unlikely to provide adequate coverage of a particular topic of interest. The size of logical domains can be influenced through adjustment of various parameters in a preferred embodiment of the algorithm of the present invention.

In addition, according to another preferred embodiment described herein, a method is presented for constructing multi-granular and topic-focused site maps. The site maps are preferably constructed utilizing such information as directory structures derived from URLs, page contents, and link structure. In these site maps, Web site topology is preserved and displayed, and document importance, as measured by semantic relevance and external citation, is used for selecting pages which are to be displayed as well as prioritizing the presentation of pages and directories.

Briefly, the technique of site map construction includes the following steps: identifying logical domains within a physical domain or Web site; determining page importance based on citation analysis and adjusting page importance based upon page contents; adjusting the contents and entry pages of all the logical domains based on links, directory paths, and page importance; and selecting the entry pages of those logical domains having higher importance scores for presentation in the site map.

BRIEF DESCRIPTION OF THE DRAWINGS

The above-mentioned and other advantages of the present invention will become more apparent upon a detailed examination of the preferred embodiments thereof with reference to the attached drawings in which:

FIG. 2 shows a list of exemplary rules and scoring functions such as may be used in the method of the present invention for scoring entry page candidates.

DETAILED DESCRIPTION OF THE PREFERRED EMBODIMENTS

Figure 1:
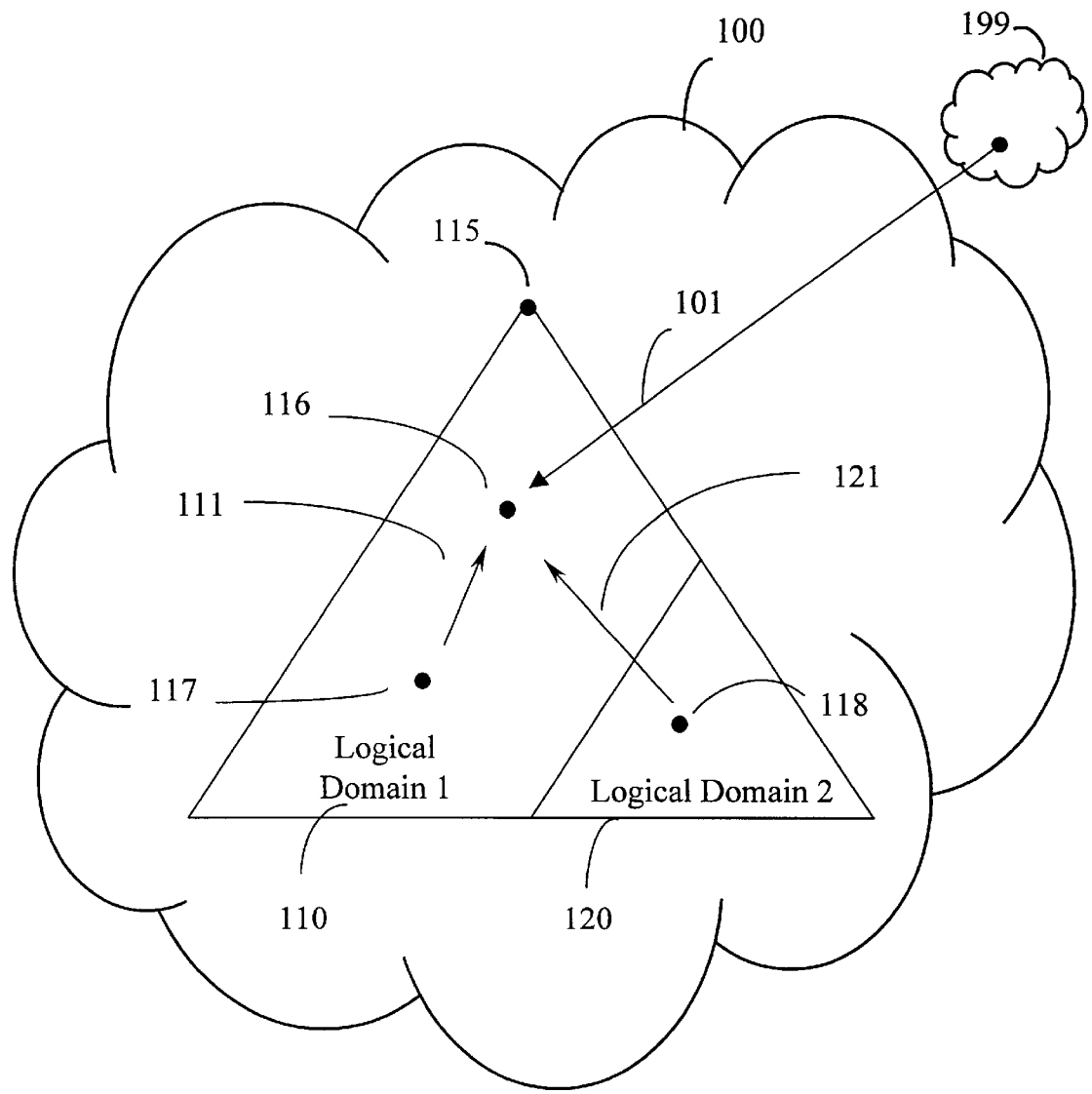
FIG. 1 is an illustration showing two logical domains defined within a single physical domain, and further showing the types of links considered with respect to the definition of logical domains.

Turning now to the drawings, FIG. 1 is an illustration showing the concept of two logical domains defined within a single physical domain, and further depicting the types of links considered with respect to the definition of logical domain boundaries. In FIG. 1, a physical domain is designated by reference numeral 100. This physical domain 100 may be part of a larger search space, such as the World Wide Web or a hypermedia, such as XML, database. In the case of the Web, for example, a physical domain 100 is defined strictly according to its host name; that is, a physical domain 100 is defined as a set of HTML documents, or pages, with the same domain name. Typically, a physical domain 100 is organized into one or more directories, the names of which are appended to the host name in the URL for location purposes. The pages having the URLs www.ccrl.com and www.ccrl.com/dl99ws/, for example, are both hosted by a Web server (or plurality of Web servers) having a unique host name, namely, www.ccrl.com. Both pages are, consequently, in the same physical domain, though they are not in the same directory within that physical domain.

According to one preferred embodiment of the present invention, any given physical domain 100 may be partitioned and reorganized into one or more logical domains, preferably in response to a request for information. Such a request in the context of the Web, for example, may comprise initiation of a keyword query, selection of a node for navigation on a site map, selection of a topic of interest from a menu or icon list, and the like. Logical domains comprise at least one page selected from the physical domain and are preferably ranked according to subject matter relevance with respect to the information requested as described in detail below.

Looking more closely at FIG. 1, a first logical domain is designated as reference numeral 110 and a second logical domain is designated as reference numeral 120. While the definition of a physical domain 100 depends upon domain name, a logical domain, such as 110 or 120, is defined as a set of pages (within a physical domain 100) which, as a whole, is self-contained and represents a logical unit of information. This information need not be common among all the pages in the logical domain 110 or 120; the essence of logical domains 110 and 120 is that the information contained therein, when considered as a whole, pertains to a particular theme, function, concept, or topic of interest which is preferably related to the information requested.

The structure of logical domains in general is best understood through close examination of logical domain 110 in FIG. 1. The "root page" of a domain, whether physical or logical, is called an "entry page." The entry page is generally meant to be the first page (among a plurality of pages located in a certain directory) to be visited by the users navigating that domain. The entry page for logical domain 110 is designated as reference numeral 115 in FIG. 1. Entry page 115 can therefore be considered the first page intended to be visited by users browsing logical domain 110. In addition, logical domain 110 also has boundaries, represented by the solid lines in FIG. 1. The boundaries are defined according to the pages, such as pages 116 and 117, assigned to entry page 115 by the method of the present invention as discussed in detail below.

The hypermedia pages (such as are represented by the small circles in FIG. 1) which make up physical domain 100 are typically linked together via hyperlinks, such that navigation from page to page is possible. A distance between a first page and a second page can be defined according to the number of links a user must traverse in navigating from the first page to the second. Likewise, a radius around a particular page can be defined according to distance. For example, a radius of r=2 around a particular page P encompasses all of the pages which can be reached by traversing 2 hyperlinks, starting at page P.

FIG. 1 further shows the types of links, which are represented by the arrows in FIG. 1, considered by the method of the present invention. An "external" link 101, for example, is defined as a link to a page 116 in a logical domain 110 from a page which is not in the same physical domain 100, but rather is in a different physical domain such as indicated by reference numeral 199. An inter-domain link 121, likewise, is defined as a link to a page 116 in a logical domain 110 from a page 118 which is in a different defined logical domain 120. Finally, a intra-domain link 111 is defined as a link to a page 116 in a logical domain 110 from a page 117 within the same logical domain 110.

As will be described in detail below, the preferred method of the present invention begins by defining logical domains. This definition is accomplished first by identifying entry page candidates; one entry page is selected for each logical domain sought. Logical domain boundaries are then defined by assigning remaining pages in the physical domain to the entry pages. Some functions of logical domains can be summarized as follows.

Entry page for navigation: A page having a URL ending in /index.html is the default entry page of a directory for most Web servers (for example, www.ccrl.com/index.html is the entry point for www.ccrl.com). Such a page may have a site map or a number of links to assist users in navigating the site.

Personal site: Usually, personal web sites do not constitute physical domains, per se, but rather they are located within a physical domain. For example, www.cs.umd.edu/~candan/ and www.cs.umd.edu/users/okan/ are the entry pages for individuals' personal Web sites. Notwithstanding their being part of a larger physical domain, these personal Web sites are independent to the extent that they relate to an individual's particular interests; as such they can be viewed as logical domains and treated as individual entities.

Topic site: Web pages related to a particular topic are usually grouped together under a specific directory. Given the relation to a particular topic, these entire directories can often be considered logical domains in their own right. Such logical domains, when used, for example, to organize a large university's physical domain, may relate to class information, weekly seminar announcements, faculty directories, particular research project Web sites, and so forth. For example, www-db.stanford.edu/people/ and www.cs.umd.edu/projects/amanda/ can be viewed as logical domains by themselves.

Popular site: Sometimes a page in a domain may be more popular than the entry page of that domain. Such a popular page, indicated by a large number of external incoming links (i.e.: citation), may be viewed as an entry page of a discrete logical domain. Some example pages of this kind include the following: publication pages of well-known researchers or professors; particularly popular "hobby" pages; and instructional, tutorial, reference, or direction pages, such as www.cs.umd.edu/pugh/intro-www-tutorial.

Turning now to FIG. 2, there is presented an exemplary set of rules and scoring functions for use in the method of logical domain definition of the present invention. As can be appreciated by a close examination of FIG. 2, the rules consider each page in the physical domain and identify logical domain entry pages based upon: available Web page metadata describing the content of the page, such as title, URL string, and anchor text; and link structures including popularity by citation. Each rule has an associated scoring function. Every page in the physical domain is evaluated for compliance with the rules and assigned a score accordingly. The higher a page scores according to the functions as applied by the rules, the more likely that page is a logical domain entry page. After all the pages are scored, a portion of the highest scoring pages are used as logical domain entry page candidates for boundary definition. In a preferred embodiment of the present invention, these logical domain entry page candidates may be displayed in a site map, as described in detail below. Following is a discussion of the rules in detail. Note that the scoring functions presented in FIG. 2 are illustrative and offered by way of example only.

Rule 1: If a page has a URL ending with a user home directory, which takes the form of "/~username/," the score of that page is increased by a predetermined amount, for example, 60. Such a URL is likely to indicate that the page is an entry page for an individual's home Web site. A personal Web site is viewed as a logical domain. Note that "/~username/" and "/~username/index.html" are treated identically in this embodiment. The string "index.html" at the end of a URL is not considered when applying the rules for identifying logical domain entry pages. Note that the two pages having the URLs www-db.stanford.edu/~widom/widom.html and www.cs.umd.edu/users/candan/ do not score here, even though they are individuals' home pages, since these URLs do not satisfy this rule.

Rule 2: If a page has a URL with a path ending with a certain word given in a topic word list, such as, for example, "people" or "seminar," and the page is not located in a directory under a user home page, then the page is a good candidate for a logical domain entry page. By way of example only, in the current implementation, a topic word list for the .edu domain contains "people," "users," "faculty," "students," "class," "seminar," and "project." Other considered topic words include "FAQ" and "Information" for general purpose Web sites, such as those maintained by NEC and W3C. If the method of the present invention can identify a page having a URL ending with a word in the topic word list, the score for the page is increased by a predetermined amount, for example, 30. One URL which satisfies this rule, for example, is www-db.stanford.edu/people/. Pages having the URLs www.cs.umd.edu/projects/omega/ and www.cs.umd.edu/projects/SoftEng/tame/ do not satisfy this rule, though a topic word is contained in the paths, since the URLs do not end with a word in the topic word list.

Rule 3: A "/" character at the end of a URL, such as in the URL www.ccrl.com/dl99ws/, indicates that an index page (i.e.: index.html) exists in that directory. These URLs designate pages which are designed to be entry pages for navigating the directories to which they belong; the score of a page having such a URL is increased accordingly. URLs such as www.cs.umd.edu/projects/omega/ and www-db.stanford.edu/lore/ satisfy this rule. Note that /~crespo/publications/meteor/ does not satisfy the rule, however, though the URL ends with the appropriate /character. The method of the present invention preferably identifies /~crespo/, the user's home page, as a entry page. Rather than identify both the home page and the index page as entry pages, which may consequently result in several smaller logical domains, the method gives priority to the user's home page. On the other hand, the method of the present invention does not ignore the possibility that more than one logical domain can exist within a single user's Web site. For example, www.cs.umd.edu/users/sibel/poetry/ is considered a possible logical domain entry page in addition to www.cs.umd.edu/users/sibel because the /poetry/ site is very popular, as indicated by a large number of external incoming links.

Rule 4: Dynamically created pages, such as www.cs.umd.edu/cgib in /finger, are not considered as entry page candidates. Thus, the scores of such pages are reduced accordingly.

Rule 5: If the title of a page contains the word "home," "welcome," or "homepage," the presence of the word may be an indication that that the page is a logical domain entry page. The score of such a page is increased. One frequently encountered title satisfying this rule is "Welcome To My Homepage."

Rule 6: If a page, A, contains a link pointing to another page, B, with the phrase "home," "go home," or "return home" in the anchor, there is a high probability that the page being pointed to (i.e.: page B) is a logical domain entry page. The score for page B is increased.

Rule 7: This is the counterpart of Rule 6. If a page, A, under another page, B, points to page B with "home," "go home," or "return home" in the anchor, then it is likely that B is an entry page (this is Rule 6). On the other hand, A, which is under entry page B, is less likely to be an entry page itself. Based on this observation, the score of page A is reduced.

Rule 8: This is the counterpart of Rule 5. If page A, under page B, links to B, and the title of page B contains "home," "web page," "welcome," etc., then page B is likely to be an entry page based on Rule 5. On the other hand, page A is less likely to be an entry page itself Based upon this observation, the score of page A is reduced.

Rule 9: If a page has external incoming links from other physical domains, then this page is likely to be an entry page. The reason is that Web designers and HTML authors tend to link to the entry page of a particular domain rather than linking to a specific page in that domain. The score of a page is increased if that page has an external incoming link. The higher the number of external incoming links, the higher the probability of the page being a logical domain entry page, so the scoring finction adds a predetermined percentage, for example, 20%, of the number of external incoming links to the score of the page. The external incoming link information may be extracted using AltaVista Connectivity Server or another server with similar capabilities.

Rule 10: If a page has more than a predetermined number of outgoing links, for example, 20, that page might be an entry page pointing to several other pages within the logical domain. This rule utilizes logic which is similar to the concept of "fan" proposed by R. Kumar et al. (Ravi Kumar, Prabhakar Raghavan, Sridhar Rajagopalan, and Andrew Tomkins. Trawling the Web for Emerging Cyber-Communities. In Proceedings of the 8th World Wide Web Conference, Toronto, Canada, May 1999). In that article, only those Web pages with more than six outgoing links are considered for topic distillation under the assumption that, in general, a good Web page should not have fewer than six links. Similarly, it may be observed that a page with very few outgoing links is probably not an entry page.

Rule 11: If there are no links from any other page in the same physical domain to a particular page, the absence of incoming links is an indication that the particular page is designed to be accessed directly, and is, therefore, probably an entry page to a discrete logical domain.

The foregoing rules and scoring functions perform well in identifying appropriate logical domain entry pages in most cases. It will be apparent to those skilled in the art that more sophisticated schemes, based on machine learning and additional tuning, for example, can further improve the results. Improvements can also be made through the development of techniques for identifying mirror sites and identical documents with symbolic links. If, for example, multiple URLs identify a single page, the URLs should be merged (i.e.: treated as a single entity) for evaluation, since they represent a single entity. Pre-process merging of such URLs which point to the same page, such as www.cs.umd.edu/~candan/ and www.cs.umd.edu/~candan/index.html, is useful for eliminating redundant identification of a single page. Some slightly more sophisticated techniques, such as those disclosed in Mirror, Mirror, on the Web: A Study of Host Pairs with Replicated Content (Krishna Bharat and Andrei Z. Broder, In Proceedings of the 8th World Wide Web Conference, Toronto, Canada. May 1999.), can be used for this purpose.

After all pages are scored, a certain percentage or number of pages with higher scores are chosen as entry page candidates to form logical domains. When entry pages are defined, the contents, or pages within the boundaries, of each potential logical domain are identified using path information and link structure. Logical domain boundary definition begins with using path information to assign all pages in the physical domain to one or more entry pages. Next, adjustments in the scope of the logical domains are made based upon: the total number of logical domains sought; the number of pages currently in each logical domain; and the topology of the site. The method of the present invention can include checking accessibility of the pages within the boundaries and the entry pages through links, removal of particularly small logical domains, and reassignment of the contents of removed logical domain to remaining logical domains.

Figure 3:
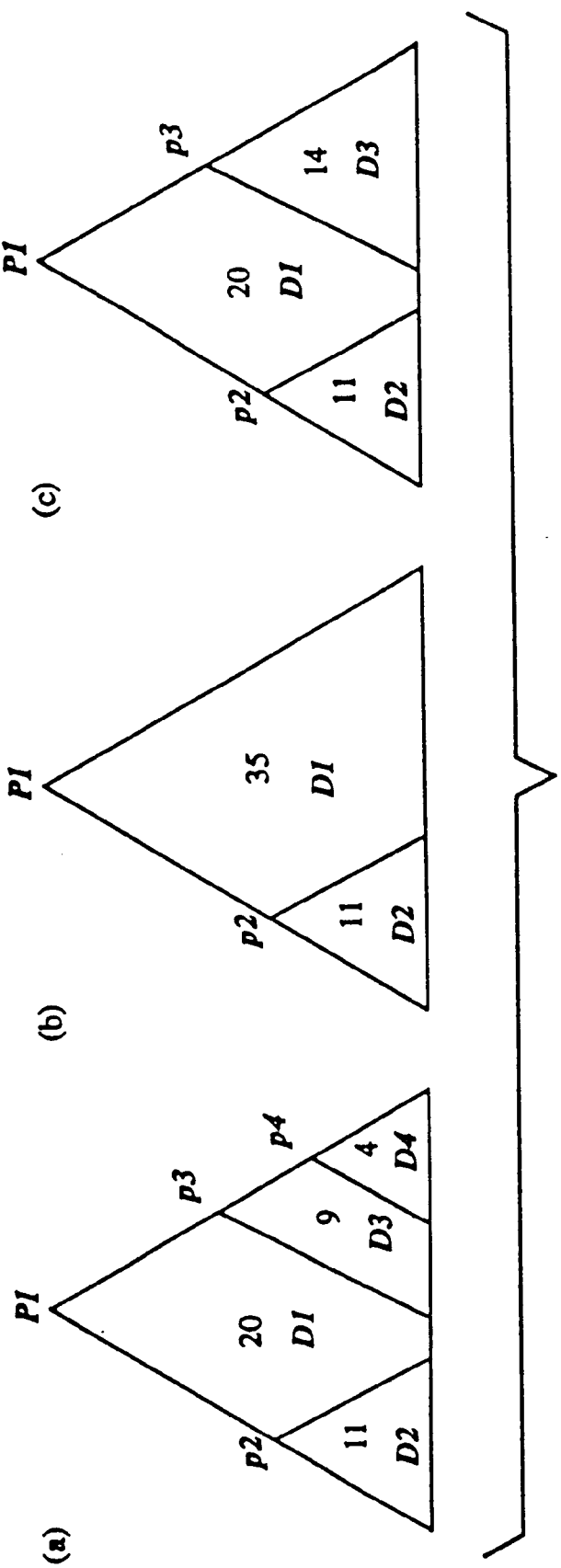
FIG. 3 illustrates a method of dynamic page reassignment as it relates to the definition and adjustment of logical domains.

FIG. 3 illustrates one method of logical domain boundary definition and dynamic page reassignment according to a "path-based" approach. FIG. 3($a$) shows four entry pages, $P_1$ through $P_4$, and the corresponding logical domains, $D_1$ through $D_4$, respectively. The numerals located directly above $D_1$ through $D_4$ indicate the number of pages contained within the boundaries of each respective logical domain $D_1$ through $D_4$; that is, $D_1$ comprises 20 pages within its boundaries, $D_2$ comprises 11, and so on. In the following example, it is assumed that the method of the present invention has been initialized with a minimum logical domain size restraint of 10 pages. Logical domains having fewer than 10 pages within their boundaries will be removed, and the pages therein will be reassigned.

FIG. 3($b$) shows the results of one static method of adjusting the size of logical domains. While $D_2$ remains unchanged relative to the situation shown in FIG. 3($a$), small logical domains $D_3$ and $D_4$ have been removed, since their boundaries comprise fewer pages than the minimum required. Both the pages within the boundaries of $D_3$ and $D_4$, as well as the entry pages, $P_3$ and $P_4$, themselves have been reassigned to $D_1$, as indicated by the number of pages now in $D_1$. FIG. 3($c$) shows the results of one method of dynamic page reassignment which occurs in a bottom up fashion. Logical domain $D_4$ from FIG. 3($a$) has been eliminated due to its small size, its entry page $P_4$ as well as the pages within its boundaries having been reassigned to $D_3$. Note that logical domain $D_3$ remains, since, with the addition of 5 pages, $D_3$ is now of sufficient size to constitute a logical domain in its own right. A more detailed discussion follows.

The main purpose of the path-based approach, as shown in FIG. 3 and set forth in the following preferred algorithm, is to assign all pages in the physical domain to at least one logical domain. For example, a physical domain such as physical domain 100 in FIG. 1, is preferably partitioned and reorganized into a plurality of logical domains, wherein the logical domains collectively contain every page in the physical domain. FIG. 3($a$) shows only four logical domains, designated as $D_1$, $D_2$, $D_3$, and $D_4$. The combination of the entry pages and the boundaries of these four logical domains preferably represent the entirety of the physical domain, but in some cases they may only represent a portion of the physical domain.

The boundaries of logical domains $D_1$, $D_2$, $D_3$, and $D_4$ are initially defined as the sets of pages under the entry pages, $P_1$, $P_2$, $P_3$, and $P_4$, respectively, and are assigned to an entry page based upon directory paths. The intuition underlying the logic of FIG. 3(a) is that the pages in a logical domain would ordinarily be contained in a particular directory in a physical domain, where the entry page is at the top level of the directory. That is, the boundaries of logical domain $D_1$ are initially defined by the set of pages which occupy the same directory as $P_1$, the boundaries of logical domain $D_2$ are defined by the pages which occupy the same directory as $P_2$, and so forth.

After all the pages in all logical domains $D_1$, $D_2$, $D_3$, and $D_4$ are determined based upon the directories under all the entry pages $P_1$, $P_2$, $P_3$, and $P_4$, the method of the present invention performs a minimum size check to eliminate logical domains with very few pages, as shown in FIGS. 3(b) and 3(c) and briefly addressed above. Preferably, sparsely populated logical domains having fewer than a predetermined number of pages are eliminated, since it is likely that a logical domain having too few pages would not be suitable for organizing information in a usable form. For example, where a physical domain comprises, say, 500 pages, partitioning and reorganizing such a physical domain into 500 logical domains, each containing only a single page, is the equivalent of not organizing the physical domain at all.

A detailed algorithm preferred for defining boundaries of logical domains according to the path-based approach is described below. Preferably, the algorithm is adapted to perform recursively on every logical domain in a bottom up fashion. The disclosed algorithm utilizes the following data: all n pages in the physical domain; the score of each of the n pages in the physical domain as defined during the entry page evaluation described above; the initial number of entry page candidates, k; and the minimum number of pages required in a logical domain, min-domain-size.

Step 1: Select k pages, $P_1 \ldots P_k$, with the highest score as entry page candidates.

Step 2: Build Parent-Children-List for $P_1 \ldots P_k$ based upon path information contained in the URLs of $P_i$ and $P_j$. Specifically, $P_i$ is the parent of $P_j$ if $P_i$.hostdir is a longest substring of $P_j$.hostdir, where $P_i$.hostdir=the URL of $P_i$ without the last file name.

Step 3: Assign $P_{k+1} \ldots P_n$ to be under one of the entry pages $P_1 \ldots P_k$ to form logical domains $D_1 \ldots D_k$. $P_j$ is assigned to be under $P_i$ if and only if $P_i$.hostdir is the longest prefix of $P_j$.hostdir. $P_j$ is the entry page of the logical domain $D_j$.

Step 4: Merge $D_j$ and $P_j$ with $D_i$ recursively from the bottom to the top if the size of $D_j$ is less than min-domain-size, where $P_i$ is the immediate parent of $P_j$.

Step 5: Output all logical domain entry pages, $P_i$ and their corresponding domains, $D_i$.

Analysis of the foregoing algorithm reveals that URL string information is initially used for logical domain boundary definition. Preferably, only pages which are in the same directory as the logical domain entry page, or in a subdirectory under that entry page, can be in the same logical domain. For example, if a page in the directory www.cs.umd.edu/users/ is identified as an entry page for a logical domain, then a page in www.cs.umd.edu/projects/hcil/ generally cannot, at least initially, be in the same logical domain, even though a link might exist between the page in /hcil/ and the entry page in /users/. This is because /projects/hcil/ is under a different directory than /users/ in the physical domain.

As indicated above, the entry page and boundary definition tasks are preferably performed recursively in a bottom up fashion. Returning briefly now to FIG. 3(a), recall that $P_1$, $P_2$, $P_3$, and $P_4$ are the entry pages for the logical domains $D_1$, $D_2$, $D_3$, and $D_4$ respectively. The numbers indicate the number of pages within the boundaries of each initial logical domain. The Parent-Children-List is identified in step 2 of the algorithm as $(P_1, P_2)$, $(P_1, P_3)$, and $(P_3, P_4)$; $P_1$ is the parent of both $P_2$ and $P_3$, while $P_3$ is the parent of $P_4$. In step 4 of the algorithm, adjustments to the logical domains entail removing those domains with very few pages (i.e.: fewer than min-domain-size). In FIGS. 3(b) and 3(c) for example, the algorithm has been initialized with the parameter min-domain-size=10, such that only logical domains with 10 or more pages will survive the page reassignment process.

FIG. 3(b) shows the result of a static operation wherein all logical domains are evaluated, those not satisfying the minimum size requirement are simply eliminated, and the pages within their boundaries are reassigned. Given a minimum size parameter for logical domains of at least 10 pages, for example, such a static method of adjustment eliminates logical domains $D_3$ and $D_4$, which were identified in FIG. 3(a). In FIG. 3(b), the pages within the boundaries of $D_3$ and $D_4$, as well as the entry pages, $P_3$ and $P_4$, themselves have been reassigned to another logical domain, namely, $D_1$, which is above the removed entry pages $P_3$ and $P_4$ in the directory tree. The scheme creating the situation shown in FIG. 3(b) tends to generate logical domains as an hierarchy of only a few directory levels; that is, the domains closer to the root page will gather a lot of released pages from the bottom domains.

A more elegant method of adjusting logical domain boundaries is implemented in step 4 of the algorithm presented above. When the pages within the boundaries of eliminated logical domains are dynamically reassigned in a bottom up fashion, the logical domains tend to be more evenly distributed across more directory levels than in the static reassignment scheme. The results are as shown in FIG. 3(c). First, logical domain $D_4$ is removed, since its boundaries contain fewer than the requisite number of pages. According to the preferred embodiment of step 4 as implemented by the present algorithm, the pages in $D_4$, as well as the entry page $P_4$ itself, are reassigned to the parent entry page $P_3$, and thus are now contained in $D_3$. As indicated in FIG. 3(c), logical domain $D_3$ has enough pages to satisfy the min-domain-size requirement; hence $D_3$ itself forms a logical domain, and all of the logical domains have more than 10 pages.

One of the characteristics of the foregoing path-based approach is that all pages are assigned at least one logical domain. In some situations, however, some logical domains may have isolated sub-domains. That is, navigation from a logical domain entry page to all of the pages within the boundaries of that same logical domain might not be possible; the pages unreachable from the entry page are considered isolated. According to another embodiment of the present invention, a "path+link" approach to page reassignment is developed for dealing with this drawback.

Figure 4:
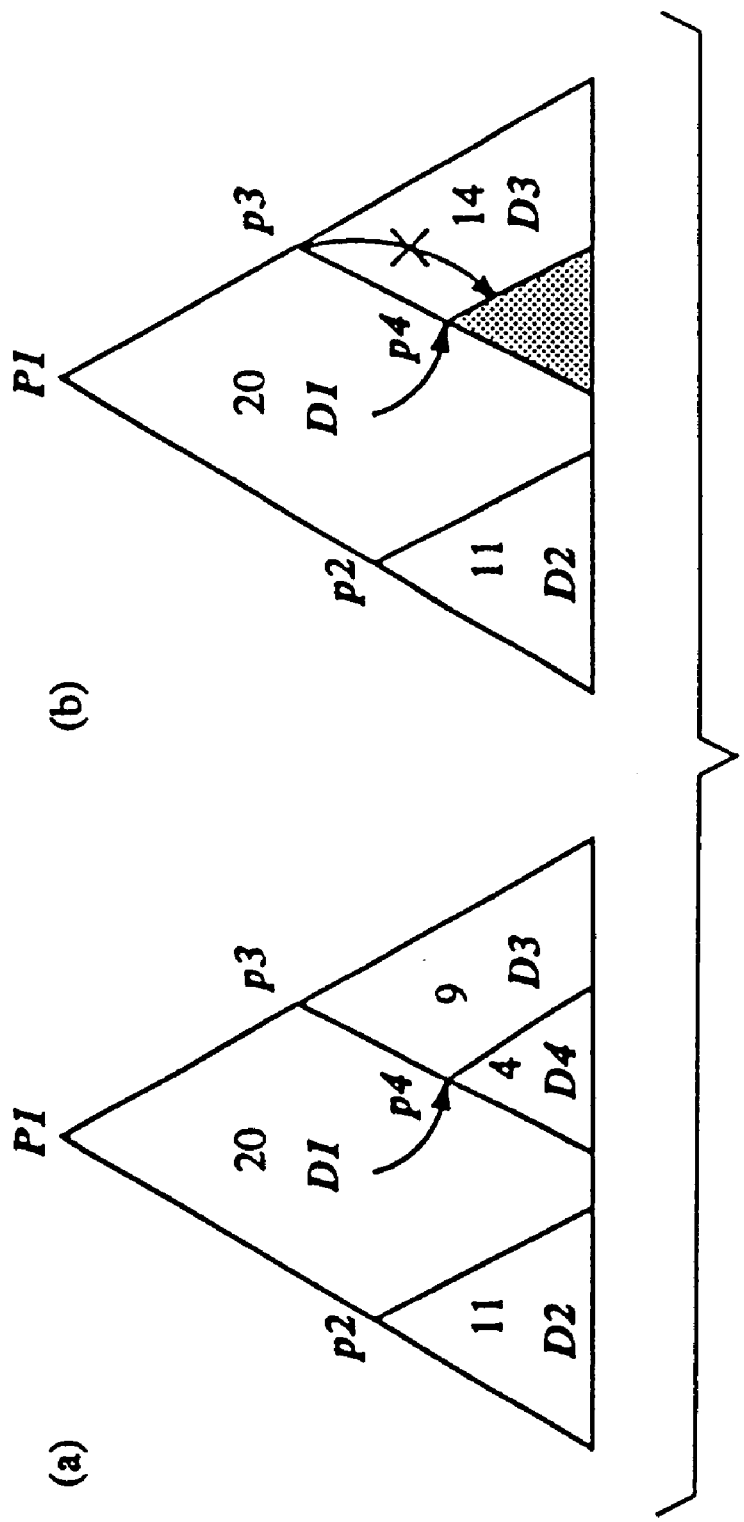
FIG. 4 illustrates a situation exemplifying a justification for another preferred method of dynamic page reassignment as it relates to the definition and adjustment of logical domains.

FIG. 4 illustrates a situation exemplifying the above-mentioned shortcoming of the path-based approached. As shown in FIG. 4(a), four logical domains are initially identified. The pages in $D_4$ can be visited by following the links from a page in $D_1$ as indicated by the arrow in FIG. 4(a), but there is no link from any page in $D_3$ to $D_4$. According to the path-based approach for boundary definition, the pages within the boundaries of $D_4$ would be released and reassigned to the parent of $P_4$, that is, $P_3$. Given the addition of $P_4$ and the pages assigned thereto however, navigation from $P_3$ to all the pages in its own logical domain is not possible, as indicated by the crossed arrow in FIG. 4(b). Note that if $P_3$ has a link pointing to a page in $D_1$, and that page has a link pointing to a page in $D_4$, such a path is not considered; if such a path were considered, the implication would be that $D_3$ is not a tree in and of itself.

A preferred method of logical domain boundary definition and dynamic page reassignment according to the path+link approach is set forth in the algorithm below to address this situation. The path+link based approach is similar to the path-based approach, except that step 3 and step 4 of the algorithm are modified to consider page accessibility from logical domain entry pages. A new parameter, r=radius, is introduced for specifying the maximum number of links to follow for verifying accessibility. The detailed algorithm is as follows (additions to the path-based approach algorithm are underlined).

Step 1: Select k pages, $P_1 \ldots P_k$ with the highest score as entry page candidates.

Step 2: Build Parent-Children-List for $P_1 \ldots P_k$ based upon path information contained in the URLs of $P_i$ and $P_j$. Specifically, $P_i$ is the parent of $P_j$ if $P_i$.hostdir is the longest substring of $P_j$.hostdir, where $P_i$.hostdir=URL of $P_i$ without the last file name.

Step 3: Assign $P_{k+1} \ldots P_n$ to be under one of the entry pages $P_1 \ldots P_k$ to form logical domains $D_1 \ldots D_k$. $P_j$ is assigned to be under $P_i$ if and only if $P_i$.hostdir is the longest prefix of $P_j$.hostdir and $P_j$ can be reached from $P_i$ by following r hyperlinks within the union of $D_i$, $P_j$, and $D_j$. $P_j$, and $D_j$ is the entry page of the logical domain $D_j$.

Step 4: Merge the pages in $D_j$ and $P_j$, which can be reached from $P_i$ by following r hyperlinks within $D_i$, with $D_i$ recursively from the bottom to the top if the size of $D_j$ is less than min-domain-size, where $P_i$ is the immediate parent of $P_j$.

Step 5: Output all logical domain entry pages $P_i$, and their corresponding domains, $D_i$.

Figure 5:
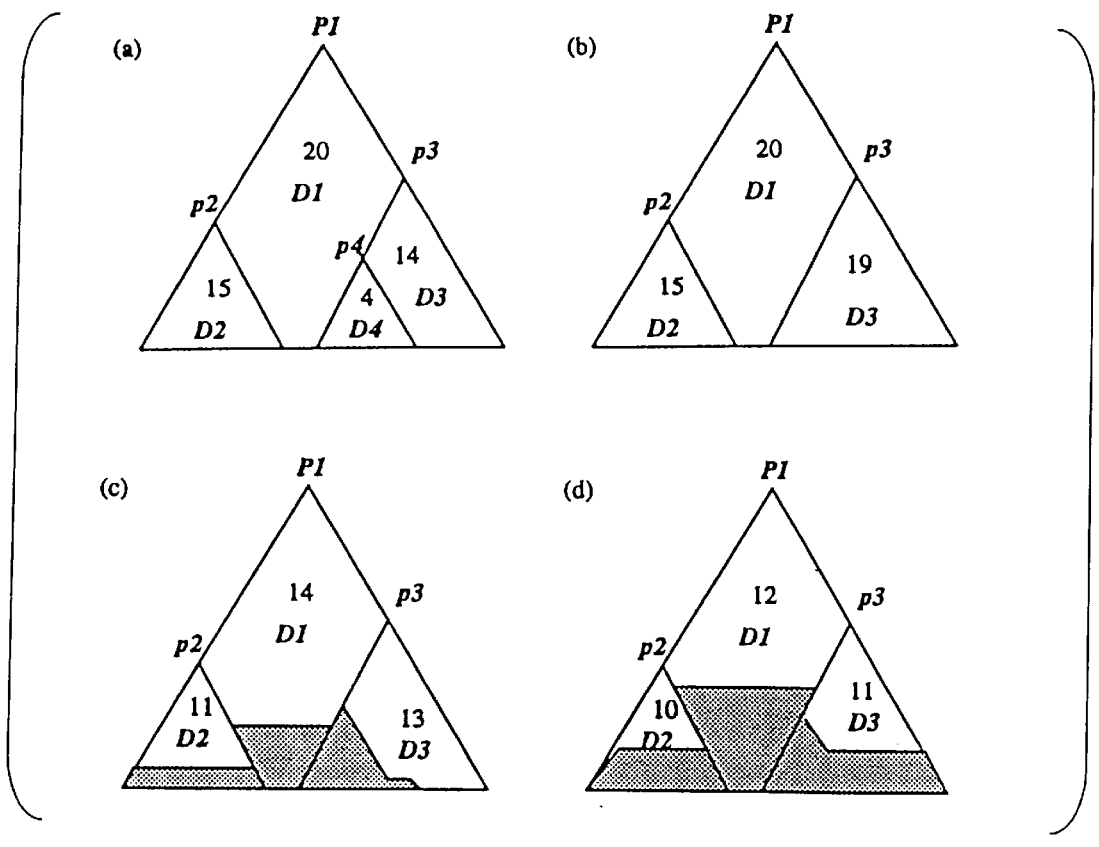
FIG. 5 shows a comparison of the operation of several methods of dynamic page reassignment.

FIG. 5 shows a graphical comparison of the results obtained using different methods of logical domain boundary definition. Specifically in FIG. 5, dynamic reassignment results according to the path-based-and path+link based approaches are compared. FIG. 5(a) shows initial results obtained for boundary definition based on only path information; note that some small logical domains may exist. In FIGS. 5(b) through 5(d), the variable min-domain-size has been initialized, creating a constraint on logical domain size; pages in eliminated logical domains have been dynamically reassigned as described below.

A strict path-based approach with min-domain-size=10, for example, will result in the situation illustrated in FIG. 5(b). Entry page $P_4$ and the four pages within the boundaries of $D_4$ have been reassigned under $P_3$; the size of each logical domain is now more desirable than in FIG. 5(a). FIGS. 5(c) and 5(d) illustrate the result obtained by checking accessibility by link with different radius values. Note that in these two cases, some pages may not be assigned to any logical domain because those pages are too isolated from the entry pages $P_1$, $P_2$, and $P_3$ to satisfy the radius requirement. The greater the value assigned to the radius variable, the more pages will be contained within the boundaries of a given logical domain.

The underlying logic behind the path+link approach is based upon the premise that pages which contain similar or related information, if not within the same directory, are either linked to each other or within a close radius. It is likely that navigation from one page to another having similar or related information will require traversing only a few links. Such pages, if within a given radius, should be part of the same logical domain, even if one is not accessible from that logical domain's entry page. A large radius will typically result in incorporation of more pages into various logical domains, such as shown in FIG. 5(c), relative to a smaller radius, which tends to result in more pages remaining unassigned to any logical domain, as shown in FIG. 5(d).

One particularly important application of the foregoing method of defining logical domains involves implementing the identified logical domains in the construction and display of site maps. Web site maps can play an essential role in assisting users with visualization of the contents and structure of a Web site; logical domains are uniquely suited for this purpose. By way of example, the following functions are supported by the techniques employed by the present invention:visualization of Web site contents and structure; automated construction of a Web site map; support for Web site navigation; support for multiple levels of detail; and support for topic-focusing.

Visualization of Web site contents and structure is preferably accomplished with the aid of a graphical user interface. The display is based upon logical domain definition technology, wherein the entry page is presented as the first page to be visited within a given logical domain. When a user views a site map at the most general, or "root," level, only logical domain entry pages or the pages ranked with the highest importance scores are shown. Viewing the contents of a particular page or directory is enabled through selection of a page anchor, for example, or through utilization of site map navigational aids. Additional documents, ranked by score, in a particular logical domain or elsewhere in the Web site are selectively viewable. A user navigating the site is thereby capable of viewing different section of the map in different levels of detail.

One method of constructing site maps in accordance with a preferred embodiment of the invention involves selecting logical domain entry pages as a function of the structure of the particular Web site mapped. The Web pages within the boundaries of each logical domain are ranked accordingly by their scores. Top ranked pages along with sub-logical domains are ideal for use in a site map as summaries of the logical domains to which they belong. The present method, advantageously based on path information, link structures, and popularity by citation, enables the process of Web site map construction to proceed automatically; that is, since the scoring of pages is part of the definition of logical domains, the site map can be constructed as a function of page scores automatically while the logical domains are identified.

Furthermore, navigation is supported and Web site topology is preserved by the method of the present invention, since the definition of logical domains requires thorough evaluation of page accessibility and link structure. In addition, since the algorithm presented below has many tunable parameters, it can generate site maps with different levels of detail. For example, a site map generated using a low min-domain-size value and a large radius (for checking accessibility by link) will be highly detailed since many logical domains are likely to be defined.

One approach to constructing site maps simply employs the results obtained from the foregoing methods of logical domain definition to produce a site map based exclusively on the partitioning of the physical domain into logical domains. The two algorithms recited above, therefore, can serve as a foundation for the construction of multi-granular site maps. Such an approach is desirable when considered in the limited context of organization of the physical domain specifically in response to a keyword query. In a more general context, however, when the request for information may not include specific keywords, greater flexibility is more appropriate. Where a user has not specified particular keywords, for example, the site mapping method of the present invention comprises the following: summarization of the contents of the Web site; visualization of the topology of the site and navigation support; multi-granularity, supporting presentation of both general and detailed contents; and content-sensitivity, enabling topic-focused site mapping. One preferred method of constructing a site map according to the present invention comprises the following:

Identifying logical domains within a particular Web site. The entry pages of these logical domains are candidates for displaying in the site map because: they are identified (according to the rules set forth above) as the relatively more informative pages in the physical domain; and they are usually designed as a starting point for navigation of their respective directories in the physical domain.

Determining page importance. Each page may be assigned a score based upon its contents and citation analysis. If a page is relevant to the information requested, the importance score for that page is increased. This step is optional.

Adjusting the entry pages and boundaries of all logical domains. This step is based upon links between pages, directory paths, and the importance scores for each page. Preferably, the logical domain boundaries are adjusted such that all the pages in each logical domain are under the same directory and linked together, and the total importance score of all the pages in the logical domain sum to a predetermined minimum value.

Selecting the entry pages of logical domains with more important pages for presentation in the site map.

Figure 6:
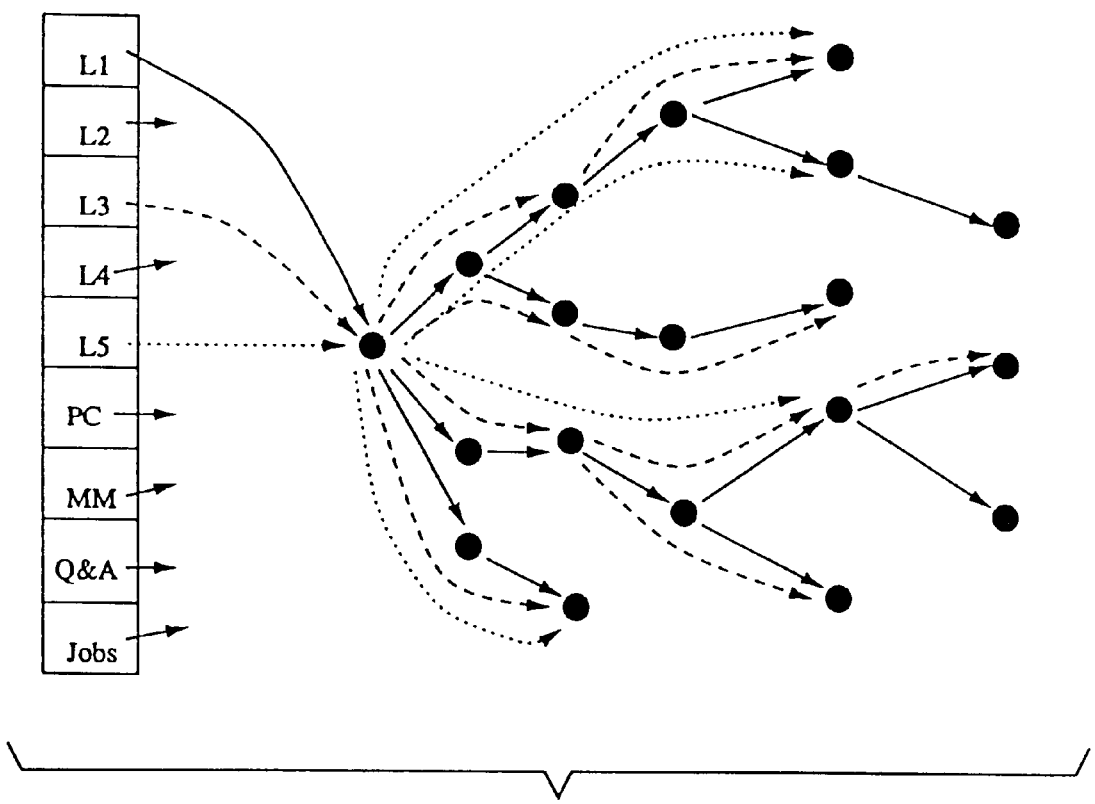
FIG. 6 is an illustration of a generalized data structure recognized by the method of the present invention for constructing site maps supporting multi-granularity and content-sensitivity.

Turning now to FIG. 6, there is shown an illustration of a generalized data structure recognized by the method of the present invention for constructing site maps supporting multi-granularity and content-sensitivity. Nodes in the site map, shown as small circles in FIG. 6, are logical domain entry pages or particularly important pages from within the boundaries of logical domains. The summarized structure, or topology, of the Web site is indicated by the arrows. One possible method of supporting multi-granular and topic-focused site maps is to create several separate maps. When a user requests a specific map, that map can be recalled and displayed. This method is inefficient, however, and demands large system overhead due to duplication.

The data structure illustrated in FIG. 6, on the other hand, supports dynamically created topic-focused and multi-granular Web site maps without a large overhead of duplicated data or re-interrogation of the physical domain. On the left of the figure, a vector is used for storing initial entry pointers for site maps of differing types or granularity. For example, $L_1 \ldots L_5$ (levels 1 through 5) point to five site maps with different levels of detail granularity. Note that $L_1$ points to the most detailed map comprising all of the nodes shown in FIG. 6; this is indicated by the solid arrows connecting all the nodes. Similarly, $L_3$ points to a map of intermediate detail, as indicated by nodes connected by the dashed arrows. Finally, $L_5$ points to the most abstract map, as indicated by the relatively few nodes connected by the dotted arrows.

Additionally, the vector on the left of FIG. 6 also contains pointers to site maps for specific topics, such as PC, Multimedia (MM), Q&A, and Jobs. If a user requests the most detailed map, the map can be generated dynamically, from the data structure, by following the pointers for $L_1$. Similarly, if a user requests a different map corresponding to, for instance, a particular topic in the vector, a map of that focused topic can be generated by following the pointers.

A significant advantage of utilizing the data structure shown in FIG. 6 is realized as follows: once the information on content and topology comprising the data structure is transmitted, for example to a remote terminal, further communication between the remote terminal and a host or server is not required. The data structure itself contains all of the information required for constructing multiple topic-focused site maps having varying degrees of granularity. Once this data structure has been communicated in its entirety to a remote terminal, a plurality of site maps can be constructed at the remote terminal without any further interface with the source of the information, i.e.: a Web server or the like.

Figure 7:
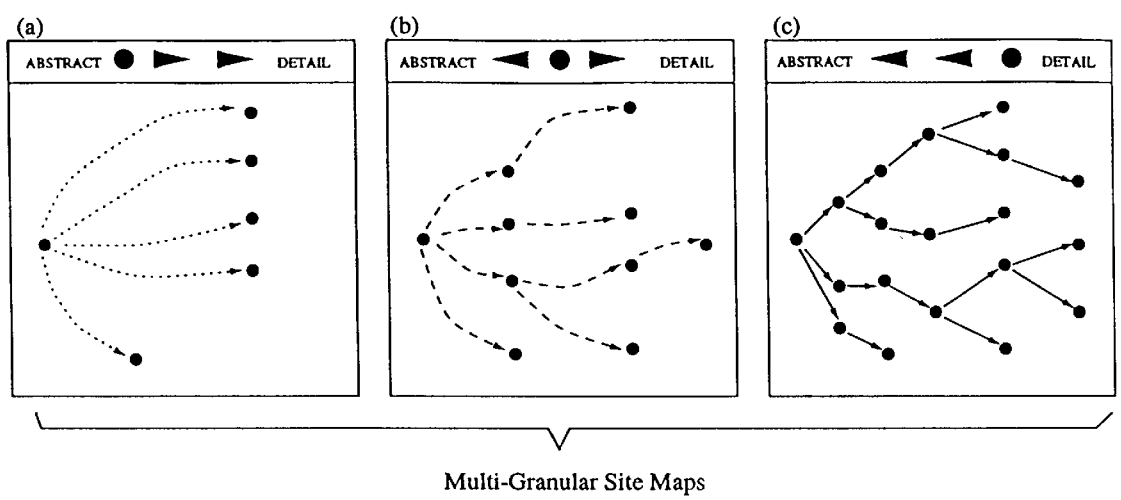
FIG. 7 is a representation of a computer display illustrating a method of displaying a multi-granular site map.
Figure 8:
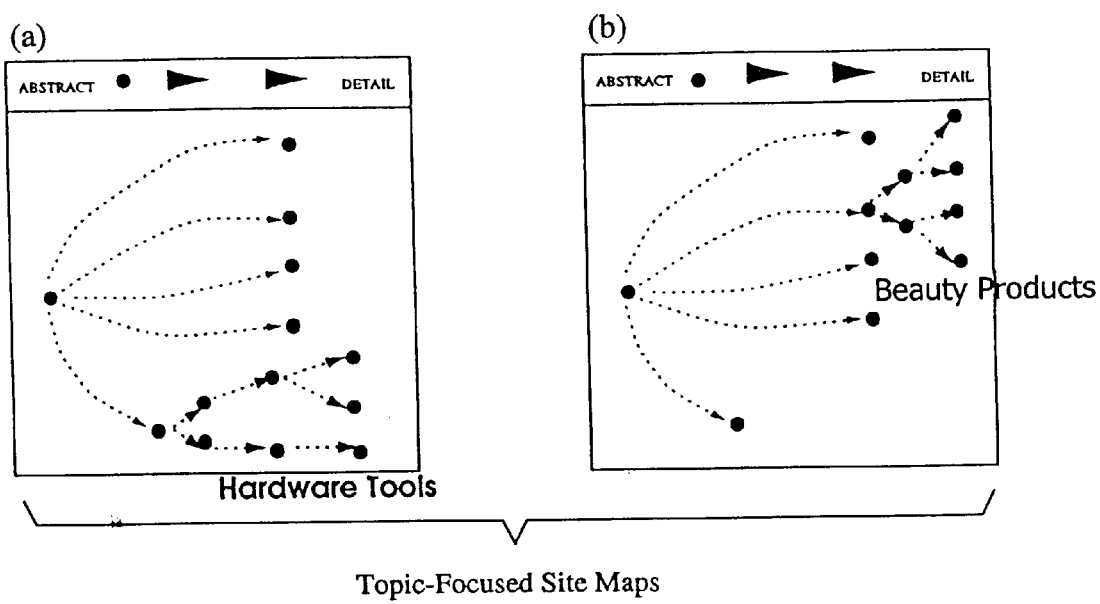
FIG. 8 is a representation of a computer display illustrating a method of displaying a topic-focused site map.

The data structure shown in FIG. 6 can be in the form of a Java™ script, for example; it operates on a stand-alone basis, providing dynamic construction of multi-granular and topic-focused site maps without interrogating the search space at every change of focus or granularity. Particularly in a wireless communications environment where band-width is at a premium and data transmission rates can be low, the method of the present invention provides a time saving browsing technique with minimum system and network overhead. Turning now to FIGS. 7 and 8, a more precise examination of the structure shown in FIG. 6 is possible.

FIG. 7 is a representation of a computer display illustrating one method of displaying a multi-granular site map. In FIG. 7(a), the site map presented is the same as $L_5$ from FIG. 6. Note the site map navigation tool at the top of FIG. 7(a); the circle indicates the present view of the topology of the site, while the arrows indicate that navigation toward a more detailed map is possible. In a similar manner, FIG. 7(b) shows the intermediate map, $L_3$, from FIG. 6. The circle in the site map navigation tool is indicative of this intermediate state. Finally, FIG. 7(c), shows the most detailed map, $L_1$, from FIG. 6; a user can only navigate toward a more abstract, or general, map. This type of multi-granular site mapping provides better interaction, or "user-friendliness," such that scaling up and scaling down the level of detail is easy and convenient.

In addition, the method of the present invention allows users to specify topics of interest; the site map is constructed so as to emphasize the pages or directories which are relevant to the focused topic. FIG. 8 is a representation of a computer display illustrating one method of displaying a topic-focused site map. Like FIG. 7, FIG. 8 is also a derivative of FIG. 6 wherein the basic abstract map, represented by the dotted arrows connecting the nodes, is a representation of $L_5$ from FIG. 6. One method of site map construction provides more detail in specific regions which are relevant to the information requested; the remaining areas of the map remain intact and visible, but only at an abstract level of granularity. For example, FIGS. 8(a) and 8(b) show two maps of abstract granularity, in general. The regions of the maps relevant to particular focused topics, here "hardware tools" and "beauty products," are shown in detail. Note that all maps maintain summarized Web site topology for navigation.

Note that the basic mechanics of the foregoing methods of defining logical domains, and the structural definitions of the logical domains themselves, are retained within the context of site mapping. Since the described methods of constructing site maps require emphasis on certain aspects of entry pages and link accessibility, however, additional description is provided here. Following are considerations with respect to implementing logical domains in a method of site map construction.

In the foregoing general discussion on identification of logical domain entry pages in a physical domain, ease of navigation and accessibility (both to and from entry page candidates) were emphasized as important factors, for example in the path+link approach to dynamic reassignment. In designing a useful and convenient site map, however, the single most important factor is ensuring that the nodes in the map (selected from the available entry pages) are both informative and representative with respect to the information sought. The first step in constructing a site map, therefore, is to determine the importance of each logical domain entry page. The importance of the entry page is preferably defined as a function of the total importance score of all of the pages within the boundaries of the logical domain that the entry page represents. Providing a score to an entry page based upon the entire contents of its logical domain is consistent with the concept that one logical domain comprising only a few important pages (as indicated by citation) may be more relevant to the information requested and therefore more informative than another logical domain comprising a large number of less relevant pages.

The first step in scoring the logical domain entry pages involves identifying the number and types links connecting the pages within the boundaries of the logical domains. That is, once logical domains are defined, there are three types of incoming links which can be characterized based upon the location of the linked pages. These types of links, only summarized here, are shown and described in FIG. 1 and the accompanying discussion above. External links are direct incoming links from pages in different physical domains. Inter-logical domain links are direct incoming links from pages in different logical domains. Note that the linking page and the linked page must be in the same physical domain. Intra-logical domain links are direct incoming links from pages in the same logical domain.

Links have been used by many search engines to rank query results based upon so-called "in-degree" (i.e.: the number of incoming links which provide navigation to a page). Such search engines assume that the quality of a document can be "assured" by the number of links pointing to it. An interesting approach to organizing topic spaces is described as "topic distillation" by Chakrabarti et al. (Soumen Chakrabarti, Byron Dom, Prabhakar Raghavan, Sridhar Rajagopalan, David Gibson, and Jon Kleinberg. Automatic Resource Compilation by Analyzing Hyperlink Structure and Associated Text. In Proceedings of the 7th World Wide Web Conference, pages 65–74, Brisbane, Queensland. Australia, April 1998). An improved version by Bharat et al. (Krishna Bharat and Monika Henzinger. Improved Algorithms for Topic Distillation in a Hyperlinked Environment. In Proceedings of the 21th Annual International ACM SIGIR Conference, pages 104–111, Melbourne, Australia, August 1998.) adds additional heuristics to consider only those pages in different physical domains and those pages with similar contents for mutual authority/hub reinforcement. Once logical domains are defined within a physical domain, the method of the present invention can further differentiate citation links (created by a third party responsive to the high quality of the information contained in the page) in a physical domain from authoring links (created by the author of the page for the purpose of facilitating navigation).

The method of the present invention presumes that the importance which can properly be inferred from citation by external links varies depending upon the type of link evaluated. For example, an inter-logical domain link is more important than an intra-logical domain link since the existence of the intra-logical domain link is more likely due to the nature of HTML page authoring rather than due to citation based upon content. Likewise, an external link can generally be considered more significant than an inter-logical domain link in terms of being a citation. By way of analogy: while a domestically renowned article is, in general, more important than a locally renowned article, an internationally renowned article is, in turn, more important than that domestically renowned article. In a preferred embodiment, the importance of a page, P, is defined as follows. Note that the following importance function is provided as an example only.

Importance$(P)=W_{ext}\times$number-of-external-link$+W_{inter}\times$number-of-interlogicaldomain-link$+W_{intra}\times$number-of-intralogicaldomain-link, where $W_{ext}$, $W_{inter}$, and $W_{intra}$, are the weights assigned to the importance of citation implied by external links, inter-logical domain links, and intra-logical domain links respectively, and $W_{ext} \geq W_{inter} \geq W_{intra}$.

To select more important and informative entry pages, and thereby, more relevant logical domains, for constructing a site map, a new parameter, min-importance, is introduced for specifying the minimum required importance score of a logical domain. That is, a logical domain, as a whole, must have a certain predetermined minimum level of importance in order for its entry page to be displayed in the site map as representative and informative. A preferred detailed algorithm for identifying logical domains for display in a Web site map follows (note that steps 1 through 3 are for identifying initial logical domains as set forth in the discussion of the path+link approach above).

Step 1: Select k pages, $P_1 \ldots P_k$ with the highest score as entry page candidates.

Step 2: Build Parent-Children-List for $P_1 \ldots P_k$ based on path information contained in the URLs of $P_i$ and $P_j$. Specifically, $P_i$ is the parent of $P_j$ if $P_i$.hostdir is the longest substring of $P_j$.hostdir, where $P_j$.hostdir=URL of $P_j$ without the file name at the end.

Step 3: Assign $P_{k+1} \ldots P_n$ to be under one of the entry pages $P_1 \ldots P_k$ to form logical domains $D_1 \ldots D_k$. $P_j$ is assigned to be under $P_i$ if only if $P_i$.hostdir is the longest prefix of $P_j$.hostdir and $P_j$ can be reached from $P_i$ by following r hyperlinks within the union of $D_i$, $P_j$, and $D_j$, where r is the radius specified for checking link accessibility.

Step. 4: Calculate importance for every page, $P_1 \ldots P_n$.

Step 5: Merge the pages in $D_j$ and $P_j$ which can be reached from $P_i$ by following r hyperlinks within $D_i$ with $D_i$ recursively from the bottom to the top if the summation of importance for all pages in $D_j$ and $P_j$ is less than min-importance, where $P_i$ is the immediate parent of $P_j$. Recalculate importance for every page in $D_i$, $D_j$, $P_i$, and $P_j$ if Di and $D_j$ are merged.

Step 6: Output all logical domain entry pages $P_i$, and their corresponding domains, $D_i$.

One design consideration is that the entry page and boundary definition tasks must be performed in a bottom up fashion in step 5 as discussed above with reference to FIG.

3. Returning now to FIG. 3(a), $P_1$, $P_2$, $P_3$, and $P_4$ are the entry pages for the logical domains $D_1$, $D_2$, $D_3$, and $D_4$, respectively and the numbers within each logical domain indicate the total importance score for each initial logical domain. The Parent-Children-List for FIG. 3(a) is ($P_1$, $P_2$), ($P_1$, $P_3$), and ($P_3$, $P_4$). In step 5, adjustments are performed by reassigning those domains with importance less than the minimum required importance rather than merely adjusting based upon the number of pages in the logical domain. One option for making this adjustment involves merely removing all entry pages for logical domains with importance less than the predetermined value, say 10. One drawback with this method is that both $D_3$ and $D_4$ would be eliminated as shown in FIG. 3(b). The more elegant method of dynamic page reassignment results in $D_4$ merging into $D_3$, and $D_3$ subsequently being retained.

An important item to note in the algorithm just presented is that recalculation is performed every time a logical domain which does not satisfy the min-importance requirement is eliminated. Recalculating the importance of pages as logical domain mergers occur (in Step 5) is required because some inter-logical domain links may be "down-graded" to intra-logical domain links as a result of each merger. The importance of some pages must be adjusted accordingly.

By considering the importance of pages, each logical domain is effectively restricted such that it must meet at least a minimum required importance before its entry page merits a node on the site map as shown in FIGS. 6 through 8. Additionally, the algorithm is tunable. Increasing the value of the variable min-importance increasingly ensures that marginally relevant entry pages and logical domains will not be emphasized in the site map.

The site maps constructed by the method of the present invention are adapted to be both topic-focused and multi-granular so as to present particular subjects of interests a user in varying degrees of detail. For example, the site maps for the physical domain www.nec.com with respect to two different topics, say, "computer" and "multimedia," will be different. Close examination of FIG. 8 and the algorithm disclosed herein reveals that the disclosed method of site map construction, in all of its preferred embodiments, is adapted to account for the following two requirements: logical domains which have more pages related to a focused topic of interest should be displayed in more detail than other, less relevant, logical domains; and, although logical domains related to specific areas are emphasized, the topology of the whole physical Web site and other logical documents should still be presented in general form to aid in visualization of the over-all content and topology of the physical domain and to guide users in navigation of the Web site.

A preferred modification of the variables used in the site map construction algorithm is presented here. Note that the heuristic itself need not change; the emphasis shifts, however, from measuring page importance according to incoming links to measuring page importance according to relevance to a particular topic. The contents of each page in each physical domain are considered; each page P is assigned a score according to a relevance function, Relevance(P, topic), which evaluates the relevance of each page with respect to a given topic of information requested. By way of example only, the function for measuring the importance of a page P based on external links, inter-logical domain links, and intra-logical domain links can be modified as follows to consider a given focused topic.

$$Importance_{topic}(P)=(1+3\times Relevance(P, topic))\times(W_{ext}\times \text{number-of-external-link}+W_{inter}\times\text{number-of-inter-logicaldomain-link}+W_{intra}\times\text{number-of-intralogicaldomain-link}).$$

Examination of the foregoing exemplary $Importance_{topic}$, (P) function indicates that the Importance(P) of a page which is irrelevant with respect to the information requested will not change relative to the score assigned to that page based upon incoming links alone. The importance of pages relevant to the focused topic, however, can increase up to 300%, depending upon the value of Relevance(P, topic), which represents relevance of the content to the information requested. In the preferred embodiment presented here, the algorithm itself does not determine the magnitude of Relevance(P, topic), but rather imports values calculated by other search engines, such as HotBot, for example.

By considering page relevance with respect to the focused topic requested, logical domains with relevant contents are more likely to be selected by the algorithm presented above. Consequently, more nodes are displayed in the map. The additional logical domains provide more information, and, in addition, that information is more likely to be of interest to the user. Note that logical domains displayed throughout the remainder of the map are not changed in FIGS. 8(a) and 8(b). The site map is constructed such that the topology of the overall site is preserved, regardless of the area of detail of interest to the user. It will be apparent to those skilled in the art that additional improvements can be made through improvements in user interface design; for example, highlighting the areas relevant to the focused topic is useful for guiding users through quick navigation.

The foregoing methods of identifying logical domains and constructing site maps are well adapted for implementation by a computer-based system. Such a system embodying the methods of the present invention comprises means for receiving a request for information, means, responsive to the request, for identifying one or more logical domains, and means for constructing multi-granular and topicfocused site maps accordingly. Additionally, means for displaying the site maps to a user may be provided by the system or may be incorporated into a remote terminal.

Typical means for receiving a request for information include a programmed computer application including a user interface, such as a graphical user interface, operable for accepting alpha-numeric character input as well as other input common in graphical user interface models, such as user-selectable check-boxes, radio buttons, and the like. Means for identifying one or more logical domains as well as means for constructing and displaying site maps in this embodiment include computer applications utilizing the methods of the present invention as discussed above with reference to FIGS. 2–8. These means may be integrated as subroutines into a single computer program, or they may be separately programmed applications designed to perform in cooperation.

Figure 9:
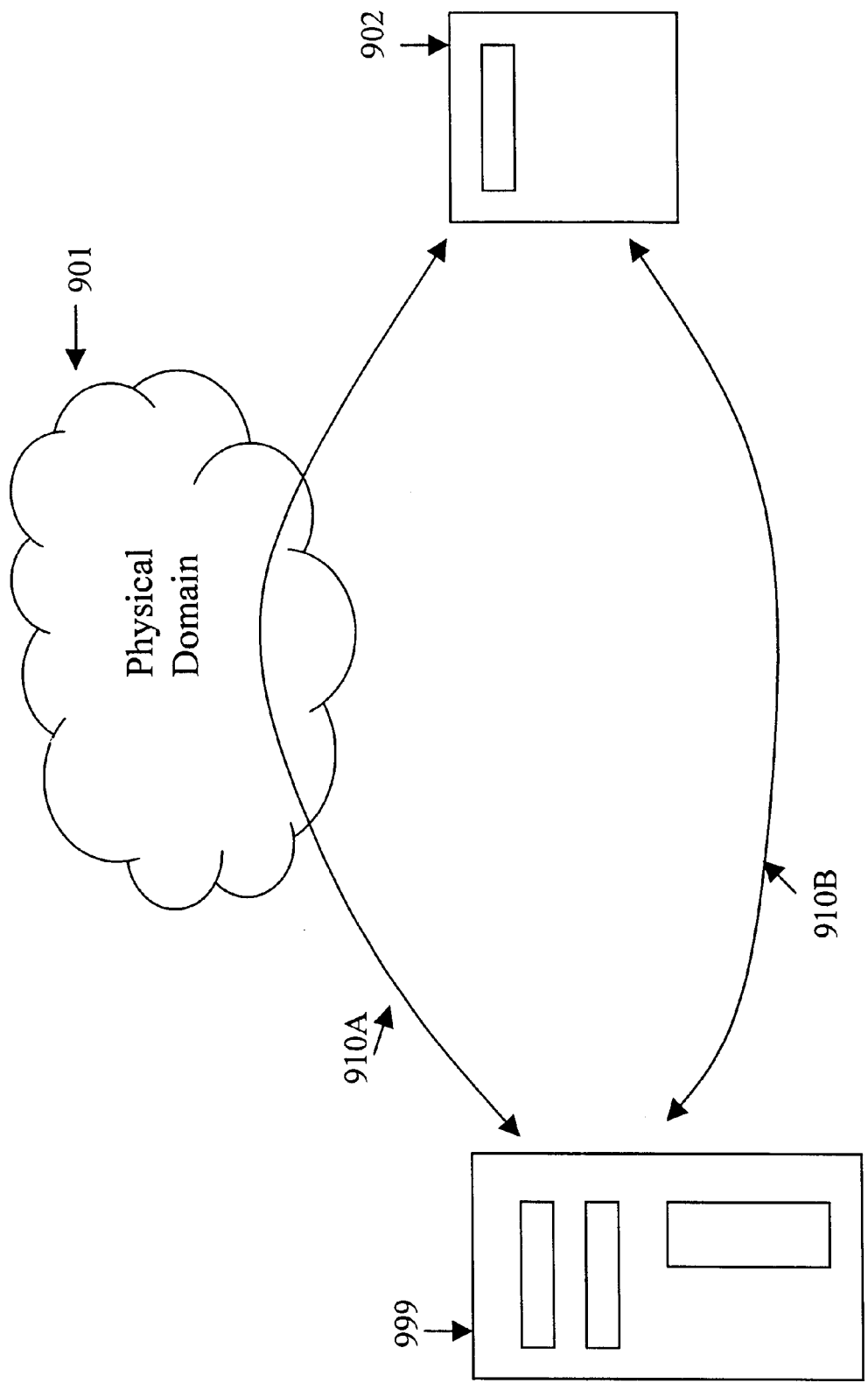
FIG. 9 shows an example of the operation of a computer-based system utilizing the method of logical domain identification and site map construction of the present invention.

FIG. 9 shows one example of the operation of a computer-based system utilizing the method of logical domain identification and site map construction of the present invention. The system is represented by the programmed computer 999. The physical domain to be partitioned and reorganized, represented at 901 and corresponding to physical domain 100 in FIG. 1, may be, for example, at least part of World Wide Web or an XML or other hypermedia database.

A user at a remote terminal 902, such as a work-station, personal computer, or wireless communication terminal generally has access to the processing capabilities of system 999 through a network connection which may or may not pass through physical domain 901, denoted as 910A and 910B, respectively. Network connections 910A, 910B may be wired connections, such as telephone lines, fiber-optic or coaxial cables, ethernet connections, and the like. Additionally, network connections 910A, 910B may be wireless, such as may be accomplished through the use of infrared, cellular or satellite radio frequency (RF), and microwave transceivers and the like.

Responsive to a request for information, which may be received, for example, via network connections 910A, 910B, system 999 implements programmed computer procedures for identifying one or more logical domains and for organizing the data structure shown in FIG. 6. Such procedures include investigating the pages within physical domain 901 as described with respect to the methods above. System 999 preferably includes programmed application procedures adapted for reporting the data structure as shown in FIG. 6, for example, via network connections 910A, 910B to remote terminal 902. As noted above with reference to FIG. 6, once the data structure is communicated to remote terminal 902, for example in the form of a Java™ script or the like, further communication between remote terminal 902 and system 999 is not required. Multi-granular and topic-focused site maps may be displayed to a user at remote terminal 902 without additional interrogation of physical domain 901 by remote terminal 902 or system 999. As will be appreciated by those of ordinary skill in this art, the system 999 can obtain information or can otherwise be informed regarding the bandwidth of the connection with any remote terminal 902. The system 999 can control the transmission of multi-granular site maps accordingly.

From the foregoing, it can be seen that the method of the present invention provides a versatile and thorough technique of partitioning and reorganizing physical domains in response to a request for information. The foregoing methodology addresses and complements the structure and arrangement of the search space. The preferred embodiments disclosed have been described and illustrated by way of example only, and not by way of limitation. Other modifications and variations to the invention will be apparent to those skilled in the art from the foregoing detailed disclosure and teachings. Thus, while only certain embodiments of the invention have been specifically described herein, it will be apparent that numerous modifications may be made thereto without departing from the spirit and scope of the invention.

What is claimed is:

1. A method of partitioning and reorganizing a physical domain, the physical domain comprising one or more directories having a plurality of pages; said method comprising:

responsive to a request for information, defining one or more logical domains within the physical domain; each one of said one or more logical domains comprising at least one page selected from the plurality of pages in the physical domain; and ranking each one of said one or more logical domains according to subject matter relevance to the information requested, wherein said defining one or more logical domains further comprises: identifying an entry page for a logical domain in the physical domain; said entry page being relevant to the information requested; identifying boundaries for a logical domain within the physical domain; said boundaries comprising one or more pages in the physical domain relevant to the information requested; and repeating said identifying an entry page and said identifying boundaries for each one of said one or more logical domains; and wherein said identifying an entry page further comprises: assigning each one of the plurality of pages in the physical domain an entry page candidate score as a function of metadata, page content, and link accessibility associated therewith; and selecting an entry page according to said entry page candidate score assigned to each one of the plurality of pages.

2. The method according to claim 1 wherein said one or more logical domains collectively contain all of the plurality of pages in the physical domain.

3. The method according to claim 1 further comprising: reporting said one or more logical domains to a user.

4. The method according to claim 1 further comprising: selectively limiting the number of said one or more logical domains defined to a predetermined maximum number.

5. The method according to claim 1 further comprising: selectively controlling a minimum size of said one or more logical domains such that each one of said one or more logical domains comprises at least a predetermined minimum number of pages.

6. The method according to claim 1 wherein the physical domain is at least part of an XML database.

7. The method according to claim 1 wherein the physical domain is at least part of a hypermedia database.

8. The method according to claim 1 wherein the physical domain is at least part of the World Wide Web.

9. The method according to claim 1 wherein said subject matter relevance is determined according to metadata associated with said at least one page.

10. The method according to claim 1 wherein relevance of said one or more logical domains to the information requested is defined according to metadata associated with said entry page and metadata associated with said one or more pages within said boundaries.

11. The method according to claim 1 wherein said one or more pages within said boundaries are restricted to being within the same directory of the physical domain as said entry page.

12. The method according to claim 1 further comprising:

establishing a predetermined link radius in the physical domain; and selectively controlling the size of said one or more logical domains by imposing the condition that said one or more pages within said boundaries are restricted to being within said predetermined link radius from said entry page.

13. The method according to claim 1 further comprising:

displaying a representation of said entry page on a display; optionally displaying representations of said one or more pages within said boundaries on a display; and repeating said displaying and said optionally displaying for each one of said one or more logical domains.

14. The method according to claim 3 wherein said reporting further comprises:

displaying, for each one of said one or more logical domains, graphical representations of said at least one page on a display.

15. The method according to claim 9 further comprising:

displaying said at least one page in said one or more logical domains in rank order.

16. The method according to claim 10 wherein said ranking further comprises:

assigning each of said one or more logical domains an importance score as a function of said relevance to the information requested.

17. The method according to claim 10 wherein said metadata includes meta tags and meta descriptions.

18. The method according to claim 10 wherein said metadata includes information related to URL strings, page titles, and page contents.

19. The method according to claim 16 further comprising:
optionally displaying representations of said one or more logical domains according to said importance score on a display.

20. The method according to claim 1 further comprising:
establishing a predetermined minimum size requirement for said one or more logical domains;
determining deficient logical domains which do not satisfy said minimum size requirement;
eliminating one of said deficient logical domains;
responsive to said eliminating, reassigning said entry page and said one or more pages within said boundaries of said deficient logical domain, eliminated as a result of said eliminating, to a parent logical domain; and
repeating said determining, said eliminating, and said reassigning until each of said one or more logical domains defined satisfies said minimum size requirement.

21. A method of partitioning and reorganizing a search space comprising a plurality of physical domains, each one of said plurality of physical domains comprising one or more directories having a plurality of pages; said method comprising:
identifying a particular physical domain from said plurality of physical domains;
responsive to a request for information, defining one or more logical domains within said particular physical domain; each one of said one or more logical domains comprising at least one page selected from the plurality of pages in said particular physical domain; and
ranking each one of said one or more logical domains according to subject matter relevance to the information requested,
wherein said defining one or more logical domains further comprises: identifying an entry page for a logical domain in said particular physical domain; said entry page being relevant to the information requested;
identifying boundaries for a logical domain within said particular physical domain; said boundaries comprising one or more pages in said particular physical domain relevant to the information requested; and
repeating said identifying an entry page and said identifying boundaries for each one of said one or more logical domains,
wherein said identifying an entry page further comprises: assigning each one of the plurality of pages in said particular physical domain an entry page candidate score as a function of metadata, page content, and link accessibility associated therewith; and
selecting an entry page according to said entry page candidate score assigned to each one of the plurality of pages.

22. The method according to claim 21 wherein said one or more logical domains collectively contain all of the plurality of pages in said particular physical domain.

23. The method according to claim 21 further comprising:
reporting said one or more logical domains to a user.

24. The method according to claim 21 further comprising:
selectively limiting the number of said one or more logical domains defined to a predetermined maximum number.

25. The method according to claim 21 further comprising:
selectively controlling a minimum size of said one or more logical domains such that each one of said one or more logical domains comprises at least a predetermined minimum number of pages.

26. The method according to claim 21 wherein each one of said plurality of physical domains is at least part of an XML database.

27. The method according to claim 21 wherein each one of said plurality of physical domains is at least part of a hypermedia database.

28. The method according to claim 21 wherein each one of said plurality of physical domains is at least part of the World Wide Web.

29. The method according to claim 21 wherein said subject matter relevance is determined according to metadata associated with said at least one page.

30. The method according to claim 21 wherein relevance of said one or more logical domains to the information requested is defined according to metadata associated with said entry page and metadata associated with said one or more pages within said boundaries.

31. The method according to claim 21 wherein said one or more pages within said boundaries are restricted to being within the same directory of said particular physical domain as said entry page.

32. The method according to claim 21 further comprising:
establishing a predetermined link radius in said particular physical domain; and
selectively controlling the size of said one or more logical domains by imposing the condition that said one or more pages within said boundaries are restricted to being within said predetermined link radius from said entry page.

33. The method according to claim 21 further comprising:
repeating said defining and said ranking for a selected number of said plurality of physical domains.

34. The method according to claim 21 further comprising:
repeating said defining and said ranking for all of said plurality of physical domains.

35. A method of partitioning and reorganizing a search space comprising a plurality of physical domains, each one of said plurality of physical domains comprising one or more directories having a plurality of pages; said method comprising:
identifying a particular physical domain from said plurality of physical domains;
responsive to a request for information, defining one or more logical domains within said particular physical domain, each one of said one or more logical domains comprising at least one page selected from the plurality of pages in said particular physical domain; and
ranking each one of said one or more logical domains according to subject matter relevance to the information requested, and repeating said defining and said ranking for a selected number of said plurality of physical domains,
wherein said defining one or more logical domains further comprises: identifying an entry page for a logical domain in said particular physical domain; said entry page being relevant to the information requested; identifying boundaries for a logical domain within said particular physical domain; said boundaries comprising one or more pages in said particular physical domain relevant to the information requested; and repeating said identifying an entry page and said identifying boundaries for each one of said one or more logical domains; and wherein said identifying an entry page further comprises: assigning each one of the plurality of pages in said particular physical domain an entry page candidate score as a function of metadata, page content, and link accessibility associated therewith; and selecting an entry page according to said entry page candidate score assigned to each one of the plurality of pages.

36. The method according to claim 35 wherein said one or more logical domains collectively contain all of the plurality of pages in said particular physical domain.

37. The method according to claim 35 further comprising: reporting said one or more logical domains to a user.

38. The method according to claim 35 further comprising: selectively limiting the number of said one or more logical domains defined to a predetermined maximum number.

39. The method according to claim 35 further comprising: selectively controlling a minimum size of said one or more logical domains such that each one of said one or more logical domains comprises at least a predetermined minimum number of pages.

40. The method according to claim 35 wherein each one of said plurality of physical domains is at least part of an XML database.

41. The method according to claim 35 wherein each one of said plurality of physical domains is at least part of a hypermedia database.

42. The method according to claim 35 wherein each one of said plurality of physical domains is at least part of the World Wide Web.

43. The method according to claim 35 wherein said subject matter relevance is determined according to metadata associated with said at least one page.

44. The method according to claim 35 wherein relevance of said one or more logical domains to the information requested is defined according to metadata associated with said entry page and metadata associated with said one or more pages within said boundaries.

45. The method according to claim 35 wherein said one or more pages within said boundaries are restricted to being within the same directory of said particular physical domain as said entry page.

46. The method according to claim 35 further comprising: establishing a predetermined link radius in said particular physical domain; and
selectively controlling the size of said one or more logical domains by imposing the condition that said one or more pages within said boundaries are restricted to being within said predetermined link radius from said entry page.

47. The method according to claim 35 further comprising: repeating said defining and said ranking for all of said plurality of physical domains.

48. A method of constructing a site map of at least part of a physical domain; the physical domain comprising a plurality of pages; said method comprising:
responsive to a request for information, defining one or more logical domains in said physical domain; each one of said one or more logical domains comprising at least one page selected from the plurality of pages;
determining the relevance of each one of said one or more logical domains relative to the information requested; and
reporting said one or more logical domains to a user according to said relevance,
wherein said defining one or more logical domains further comprises: identifying an entry page for a logical domain in the physical domain; said entry page being relevant to the information requested; identifying boundaries for a logical domain within the physical domain; said boundaries comprising one or more pages in the physical domain relevant to the information requested; and repeating said identifying an entry page and said identifying boundaries for each one of said one or more logical domains; and
wherein said identifying an entry page further comprises: assigning each one of the plurality of pages in the physical domain an importance score as a function of metadata, page content, and link accessibility associated therewith; and selecting an entry page according to said importance score assigned to each one of the plurality of pages.

49. The method according to claim 48 wherein said one or more logical domains collectively contain all of the plurality of pages in the physical domain.

50. The method according to claim 48 wherein the physical domain is at least part of an XML database.

51. The method according to claim 48 wherein the physical domain is at least part of a hypermedia database.

52. The method according to claim 48 wherein the physical domain is at least part of the World Wide Web.

53. The method according to claim 48 further comprising: assigning each one of said one or more logical domains an importance score as a function of the sum of said importance score assigned to said entry page and to each of said one or more pages within said boundaries.

54. The method according to claim 48 wherein said metadata includes meta tags and meta descriptions.

55. The method according to claim 48 wherein said metadata includes information related to URL strings, page titles, and page contents.

56. The method according to claim 53 further comprising: establishing a predetermined minimum importance score for said one or more logical domains;
determining deficient logical domains which do not satisfy said minimum importance score;
eliminating one of said deficient logical domains;
responsive to said eliminating, reassigning said entry page and said one or more pages within said boundaries of said deficient logical domain, eliminated as a result of said eliminating, to a parent logical domain; and
repeating said determining, said eliminating, and said reassigning until each of said one or more logical domains defined satisfies said minimum score.

57. The method according to claim 48 further comprising: calculating a topic relevance score for each one of the plurality of pages in the physical domain; said calculating comprising modifying said importance score assigned to each one of tile plurality of pages in the physical domain by a factor according to said relevance to the information requested.

58. The method according to claim 57 further comprising: assigning each one of said one or more logical domains a topic score as a function of the sum of said topic relevance score assigned to said entry page and to each of said one or more pages within said boundaries.

59. The method according to claim 58 further comprising: displaying a representation of said entry page on a display;
optionally displaying representations of said one or more pages within said boundaries on a display; and
repeating said displaying and said optionally displaying for each one of said one or more logical domains.

60. The method according to claim 59 wherein said site map is multi-granular such that said reporting is selectively adjustable according to said importance score assigned to each of said one or more logical domains.

61. The method according to claim 59 wherein said site map is topic-focused such that said reporting is selectively adjustable according to said topic score assigned to each of said one or more logical domains.

62. A computer-based system for constructing a site map of at least part of a physical domain; the physical domain comprising a plurality of pages; said system comprising:

means, responsive to a request for information, for defining one or more logical domains in said physical domain; each one of said one or more logical domains comprising at least one page selected from the plurality of pages;

means for determining the relevance of each one of said one or more logical domains relative to the information requested; and means for reporting said one or more logical domains to a user according to said relevance, wherein said means for defining one or more logical domains comprises, for a selected number of logical domains: means for identifying an entry page for a logical domain in the physical domain; said entry page being relevant to the information requested; and means for identifying boundaries for a logical domain within the physical domain; said boundaries comprising one or more pages in the physical domain relevant to the information requested; and wherein said means for identifying an entry page further comprises: means for assigning each one of the plurality of pages in the physical domain an importance score as a function of metadata, page content, and link accessibility associated therewith; and means for selecting an entry page according to said importance score assigned to each one of the plurality of pages.

63. The system according to claim 62 wherein said one or more logical domains collectively contain all of the plurality of pages in the physical domain.

64. The system according to claim 62 wherein the physical domain is at least part of an XML database.

65. The system according to claim 62 wherein the physical domain is at least part of a hypermedia database.

66. The system according to claim 62 wherein the physical domain is at least part of the World Wide Web.

67. The system according to claim 62 further comprising:

means for assigning each one of said one or more logical domains an importance score as a function of the sum of said importance score assigned to said entry page and to each of said one or more pages within said boundaries.

68. The system according to claim 62 wherein said metadata includes meta tags and meta descriptions.

69. The system according to claim 62 wherein said metadata includes information related to URL strings, page titles, and page contents.

70. The system according to claim 67 further comprising:

means for calculating a topic relevance score for each one of the plurality of pages in the physical domain as a function of said importance score.

71. The system according to claim 70 further comprising:

means for assigning each one of said one or more logical domains a topic score as a function of the sum of said topic relevance score assigned to said entry page and to each of said one or more pages within said boundaries.

72. The system according to claim 71 further comprising:

means for displaying a representation of said entry page on a display; and means for optionally displaying representations of said one or more pages within said boundaries on a display.

73. The system according to claim 72 wherein said site map is multi-granular such that said means for displaying is selectively adjustable according to said importance score assigned to each of said one or more logical domains.

74. The system according to claim 72 wherein said site map is topic-focused such that said means for displaying is selectively adjustable according to said topic score assigned to each of said one or more logical domains.

75. The system according to claim 62 wherein said means for reporting comprise:

a data transmission connection for transmitting and receiving data to and from a remote terminal.

76. The system according to claim 75 wherein said data transmission connection is wireless.

77. The system according to claim 75 wherein said data transmitted to said remote terminal comprises a Java™ script.

78. The system according to claim 75 wherein said data includes a multi-granular site map which is transmitted to said remote terminal in accordance with a bandwidth of said data transmission connection.

\* \* \* \* \*

UNITED STATES PATENT AND TRADEMARK OFFICE
CERTIFICATE OF CORRECTION

PATENT NO.    : 6,647,381 B1
DATED         : November 11, 2003
INVENTOR(S)   : Wen-Syan Li, Okan Kolak and Quoc Vu It is certified that error appears in the above-identified patent and that said Letters Patent is hereby corrected as shown below:

Column 9,
Line 23, after "itself", insert -- . -- (period);
Line 34, change "finction" to -- function --.

Column 13,
Line 35, after "$P_j$", delete "," (comma);
Line 36, delete "and $D_j$";
Line 47, change "path-based-and" to -- path-based and --;

Column 14,
Line 22, change ":visualization" to -- : visualization --;

Column 18,
Line 47, between "$P_i$" and "without", delete "." (subscripted period);
Line 55, between "Step" and "4", delete "." (period);

Column 20,
Line 37, change "topicfocused" to -- topic-focused --;

Column 24,
Line 49, between "domain" and "each", delete "," (comma) and insert -- ; -- (semicolon);
Line 54, between "requested" and "and", delete "," (comma) and insert -- ; -- (semicolon);

Column 26,
Line 53, change "tile" to -- the --.

Signed and Sealed this

Fifteenth Day of June, 2004

JON W. DUDAS
*Acting Director of the United States Patent and Trademark Office*